(12) United States Patent
Itani et al.

(10) Patent No.: US 9,804,392 B2
(45) Date of Patent: Oct. 31, 2017

(54) METHOD AND APPARATUS FOR DELIVERING AND CONTROLLING MULTI-FEED DATA

(71) Applicant: Atheer, Inc., Mountain View, CA (US)

(72) Inventors: Sleiman Itani, East Palo Alto, CA (US); Shashwat Kandadai, Cupertino, CA (US)

( * ) Notice: Subject to any disclaimer, the term of this patent is extended or adjusted under 35 U.S.C. 154(b) by 273 days.

(21) Appl. No.: 14/549,407

(22) Filed: Nov. 20, 2014

(65) Prior Publication Data

US 2016/0148414 A1 May 26, 2016

(51) Int. Cl.
| | |
|---|---|
| *G06T 15/00* | (2011.01) |
| *G02B 27/01* | (2006.01) |
| *G06T 3/40* | (2006.01) |
| *H04N 13/00* | (2006.01) |
| *H04N 13/04* | (2006.01) |

(52) U.S. Cl.
CPC ............. *G02B 27/017* (2013.01); *G06T 3/40* (2013.01); *H04N 13/0025* (2013.01); *H04N 13/044* (2013.01); *G02B 2027/014* (2013.01); *G02B 2027/0118* (2013.01); *G02B 2027/0134* (2013.01); *G02B 2027/0178* (2013.01)

(58) Field of Classification Search
CPC .................. G06T 3/40; G02B 27/017; G02B 2027/0178; G02B 2027/0118; G02B 2027/014; G02B 2027/0134; H04N 13/00
USPC ........................................................ 345/419
See application file for complete search history.

(56) References Cited

U.S. PATENT DOCUMENTS

| | | |
|---|---|---|
| 5,754,710 A | 5/1998 | Sekine et al. |
| 5,877,809 A | 3/1999 | Omata et al. |
| 5,917,657 A | 6/1999 | Kaneko et al. |
| 6,344,930 B1 | 2/2002 | Kaneko et al. |
| 6,940,473 B2 | 9/2005 | Suyama et al. |
| 7,057,650 B1 | 6/2006 | Sakamoto et al. |
| 7,519,907 B2 | 4/2009 | Cohen et al. |
| 7,653,298 B2 | 1/2010 | Ono et al. |

(Continued)

OTHER PUBLICATIONS

Non-Final Office Action dated Sep. 12, 2016, for U.S. Appl. No. 14/563,997 by Chehade et al. filed Dec. 8, 2014.

(Continued)

*Primary Examiner* — Phu K Nguyen
(74) *Attorney, Agent, or Firm* — Mohr Intellectual Property Law Solutions, PC

(57) ABSTRACT

Left and right visual feeds are configured to form contiguous non-stereo left, stereo central, and non-stereo right display regions. Viewed together, an appearance of full-width stereo three-dimensionality may be achieved. The left and right display regions have the brightness of the left or right feeds respectively, while the central display region has the combined brightness of the left and right feeds. The parts of the left and right feeds that cooperate to form the stereo central display region may be scaled in brightness, so that the central display area is of uniform brightness with the left and right display areas, or smoothly varying, continuous, varying in a controlled manner, etc., rather than appearing as a sharply-defined area twice as bright as the left and right display areas. Scaling profiles may be uniform step-downs, linearly decreasing, quadratically decreasing, otherwise curved, some combination thereof, etc.

50 Claims, 12 Drawing Sheets

(56) References Cited

U.S. PATENT DOCUMENTS

| | | | |
|---|---|---|---|
| 8,023,000 B2 | 9/2011 | Tamaru et al. | |
| 8,170,326 B2 | 5/2012 | Gulati et al. | |
| 8,184,171 B2 | 5/2012 | Tamaru et al. | |
| 8,384,803 B2 | 2/2013 | Iizuka et al. | |
| 8,390,729 B2 | 3/2013 | Long et al. | |
| 8,477,232 B2 | 7/2013 | Forutanpour et al. | |
| 8,494,301 B2 | 7/2013 | Adams et al. | |
| 8,648,927 B2 | 2/2014 | Kitagawa et al. | |
| 8,676,085 B1 | 3/2014 | Batori et al. | |
| 8,824,833 B2 | 9/2014 | Dagher et al. | |
| 8,917,296 B2 * | 12/2014 | Ichihashi | G02B 27/2214 345/691 |
| 8,947,523 B2 | 2/2015 | Matsui | |
| 9,030,470 B2 | 5/2015 | Wang et al. | |
| 2002/0036693 A1 | 3/2002 | Kinjo et al. | |
| 2003/0020814 A1 | 1/2003 | Ono et al. | |
| 2003/0025821 A1 | 2/2003 | Bean et al. | |
| 2003/0052991 A1 | 3/2003 | Stavely et al. | |
| 2003/0059121 A1 | 3/2003 | Savakis et al. | |
| 2003/0164875 A1 | 9/2003 | Myers | |
| 2004/0080661 A1 | 4/2004 | Afsenius et al. | |
| 2005/0035977 A1 | 2/2005 | Yokoyama et al. | |
| 2005/0104974 A1 | 5/2005 | Watanabe et al. | |
| 2006/0014137 A1 | 1/2006 | Ghosh et al. | |
| 2006/0033824 A1 | 2/2006 | Nicholson | |
| 2006/0204077 A1 | 9/2006 | Lim et al. | |
| 2006/0221248 A1 | 10/2006 | McGuire et al. | |
| 2007/0036427 A1 | 2/2007 | Nakamura et al. | |
| 2007/0189750 A1 | 8/2007 | Wong et al. | |
| 2007/0216796 A1 | 9/2007 | Lenel et al. | |
| 2008/0002878 A1 | 1/2008 | Meiyappan et al. | |
| 2008/0158409 A1 | 7/2008 | Gotanda et al. | |
| 2008/0218612 A1 | 9/2008 | Border et al. | |
| 2008/0219493 A1 | 9/2008 | Tadmor | |
| 2008/0304013 A1 | 12/2008 | Seo et al. | |
| 2009/0238457 A1 | 9/2009 | Rittscher et al. | |
| 2010/0033617 A1 | 2/2010 | Forutanpour et al. | |
| 2010/0097476 A1 | 4/2010 | Marks et al. | |
| 2010/0128163 A1 | 5/2010 | Nagasaka et al. | |
| 2010/0177403 A1 | 7/2010 | Dolgoff et al. | |
| 2010/0194971 A1 | 8/2010 | Li et al. | |
| 2010/0245545 A1 | 9/2010 | Ilich-Toay et al. | |
| 2010/0245609 A1 | 9/2010 | Estevez et al. | |
| 2010/0254592 A1 | 10/2010 | Cheng et al. | |
| 2010/0295924 A1 | 11/2010 | Miyatani et al. | |
| 2010/0328471 A1 | 12/2010 | Boland et al. | |
| 2010/0328477 A1 | 12/2010 | Watanabe et al. | |
| 2011/0038550 A1 | 2/2011 | Obrador et al. | |
| 2011/0090313 A1 | 4/2011 | Tsuchita et al. | |
| 2011/0141239 A1 | 6/2011 | Kennedy et al. | |
| 2011/0142287 A1 | 6/2011 | Wong et al. | |
| 2011/0164816 A1 | 7/2011 | Guo et al. | |
| 2011/0193943 A1 | 8/2011 | Campbell et al. | |
| 2011/0242334 A1 | 10/2011 | Wilburn et al. | |
| 2011/0279653 A1 | 11/2011 | Hoshino et al. | |
| 2011/0317000 A1 | 12/2011 | Lee et al. | |
| 2012/0044369 A1 | 2/2012 | Irisawa et al. | |
| 2012/0057070 A1 | 3/2012 | Park et al. | |
| 2012/0105594 A1 | 5/2012 | You et al. | |
| 2012/0147206 A1 | 6/2012 | Onishi et al. | |
| 2012/0200535 A1 | 8/2012 | Stienstra et al. | |
| 2012/0236120 A1 | 9/2012 | Kramer et al. | |
| 2012/0249550 A1 | 10/2012 | Akeley et al. | |
| 2012/0307018 A1 | 12/2012 | Damstra et al. | |
| 2012/0307108 A1 | 12/2012 | Forutanpour et al. | |
| 2012/0314116 A1 | 12/2012 | Jannard et al. | |
| 2012/0320159 A1 | 12/2012 | Torres et al. | |
| 2013/0038723 A1 | 2/2013 | Tsutsumi et al. | |
| 2013/0039568 A1 | 2/2013 | Futawatari et al. | |
| 2013/0050432 A1 | 2/2013 | Perez et al. | |
| 2013/0050437 A1 | 2/2013 | Robinson et al. | |
| 2013/0064468 A1 | 3/2013 | Kask et al. | |
| 2013/0113988 A1 | 5/2013 | Wajs et al. | |
| 2013/0188019 A1 | 7/2013 | Christopher et al. | |
| 2013/0195359 A1 | 8/2013 | Yabu et al. | |
| 2013/0242057 A1 | 9/2013 | Hong et al. | |
| 2013/0258044 A1 | 10/2013 | Betts-Lacroix et al. | |
| 2013/0272600 A1 | 10/2013 | Garcia Becerro et al. | |
| 2013/0286015 A1 | 10/2013 | Robinson et al. | |
| 2013/0308032 A1 | 11/2013 | Terashima et al. | |
| 2013/0308036 A1 | 11/2013 | Peng et al. | |
| 2014/0002596 A1 | 1/2014 | Antonio et al. | |
| 2014/0002606 A1 | 1/2014 | Blayvas et al. | |
| 2014/0015933 A1 | 1/2014 | Sato et al. | |
| 2014/0056472 A1 | 2/2014 | Gu et al. | |
| 2014/0071241 A1 | 3/2014 | Yang et al. | |
| 2014/0079297 A1 | 3/2014 | Tadayon et al. | |
| 2014/0085422 A1 | 3/2014 | Aronsson et al. | |
| 2014/0085452 A1 | 3/2014 | Nistico et al. | |
| 2014/0085507 A1 | 3/2014 | Pillman et al. | |
| 2014/0098195 A1 | 4/2014 | Pace et al. | |
| 2014/0118570 A1 | 5/2014 | Chehade et al. | |
| 2014/0176673 A1 | 6/2014 | Kennedy et al. | |
| 2014/0201844 A1 | 7/2014 | Buck et al. | |
| 2014/0210823 A1 | 7/2014 | Maguire et al. | |
| 2014/0226878 A1 | 8/2014 | Bhagwan et al. | |
| 2014/0233847 A1 | 8/2014 | Ratcliff et al. | |
| 2014/0267243 A1 | 9/2014 | Venkataraman et al. | |
| 2014/0267633 A1 | 9/2014 | Venkataraman et al. | |
| 2014/0285660 A1 | 9/2014 | Jamtgaard et al. | |
| 2015/0092021 A1 | 4/2015 | Chehade et al. | |
| 2015/0093022 A1 | 4/2015 | Chehade et al. | |
| 2015/0093030 A1 | 4/2015 | Chehade et al. | |

OTHER PUBLICATIONS

Non-Final Office Action dated Sep. 14, 2016, for U.S. Appl. No. 14/564,010 by Chehade et al. filed Dec. 8, 2014.
Non-Final Office Action dated Sep. 15, 2016, for U.S. Appl. No. 14/564,007 by Chehade et al. filed Dec. 8, 2014.
Non-Final Office Action dated Sep. 8, 2013, for U.S. Appl. No. 13/786,225 by Chehade et al. filed Mar. 5, 2013.
Final Office Action dated Dec. 9, 2015, for U.S. Appl. No. 13/786,225 by Chehade et al. filed Mar. 5, 2013.
Final Office Action dated Dec. 30, 2015, for U.S. Appl. No. 14/563,997 by Chehade et al. filed Dec. 8, 2014.
Final Office Action dated Jan. 13, 2016, for U.S. Appl. No. 14/564,007 by Chehade et al. filed Dec. 8, 2014.
Final Office Action dated Jan. 12, 2016, for U.S. Appl. No. 14/564,010 by Chehade et al. filed Dec. 8, 2014.
Non-Final Office Action dated Apr. 9, 2015, for U.S. Appl. No. 14/563,997 by Chehade et al. filed Dec. 8, 2014.
Non-Final Office Action dated Mar. 11, 2015, for U.S. Appl. No. 13/786,225 by Chehade et al. filed Mar. 5, 2013.
Restriction Requirement dated Oct. 8, 2014, for U.S. Appl. No. 13/786,225 by Chehade et al. filed Mar. 5, 2013.
U.S. Appl. No. 13/786,225 by Chehade et al. filed Mar. 5, 2013.
U.S. Appl. No. 14/563,997 by Chehade et al. filed Dec. 8, 2014.
U.S. Appl. No. 14/564,007 by Chehade et al. filed Dec. 8, 2014.
U.S. Appl. No. 14/564,010 by Chehade et al. filed Dec. 8, 2014.
Nikon Imaging Products DSLR Camera Basics, Focal Length and Angle of View, retrieved from the internet, <http://imaging.nikon.com/lineup/dslr/basics/19/01.htm>, retrieved Apr. 5, 2015.
Nikon Imaging Products DSLR Camera Basics, Minimum Focus Distance, retrieved from the internet, <http://imaging.nikon.com/lineup/dslr/basics/19/04.htm>, retrieved Apr. 5, 2015.
Non-Final Office Action dated Jul. 1, 2015, for U.S. Appl. No. 14/564,007 by Chehade et al. filed Dec. 8, 2014.
Non-Final Office Action dated Jul. 2, 2015, for U.S. Appl. No. 14/564,010 by Chehade et al. filed Dec. 8, 2014.

* cited by examiner

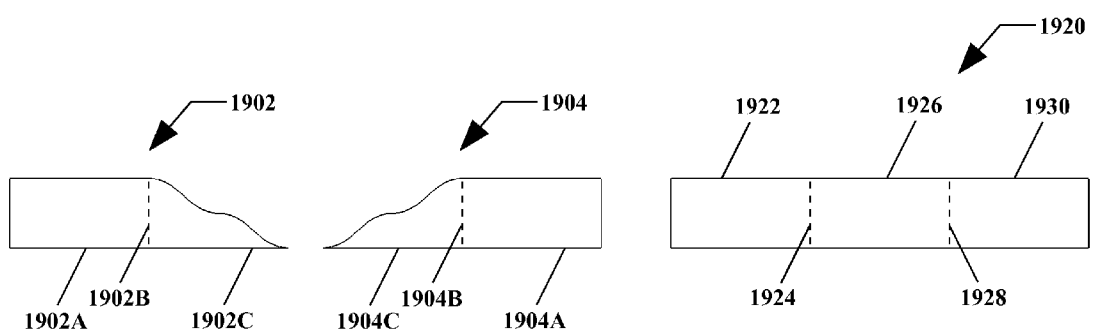
FIG. 19
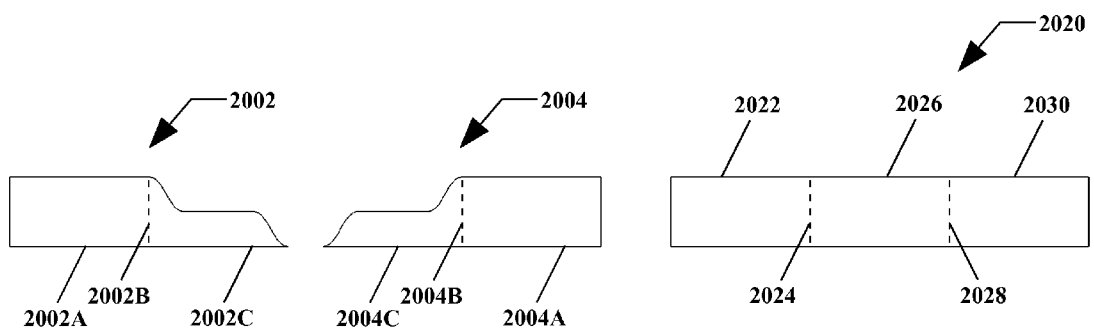
FIG. 20
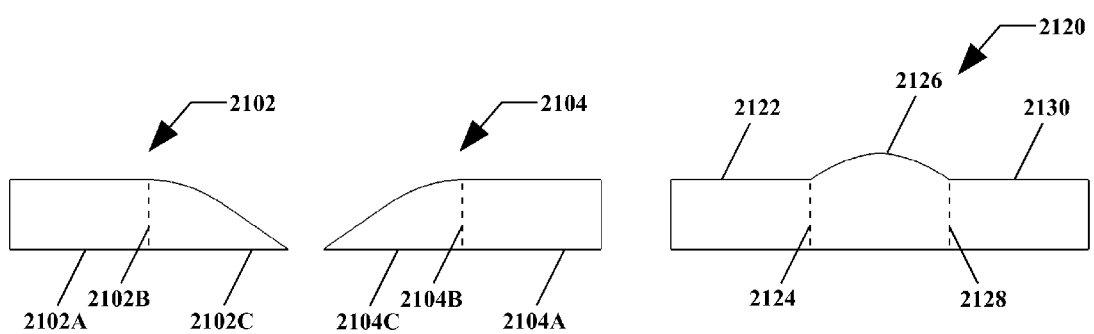
FIG. 21 - deliberate brightening ("brightness shaping")

METHOD AND APPARATUS FOR DELIVERING AND CONTROLLING MULTI-FEED DATA

FIELD OF THE INVENTION

This invention relates to delivering images and other data that have and/or may be represented by two or more feeds, including but not limited to stereo images having left and right, and to controlling features of such images including but not limited to the brightness thereof.

DESCRIPTION OF RELATED ART

Data such as imagery may be processed, stored, delivered, etc. as multiple feeds. For example, two LED or other display screens placed side-by-side may be considered to be delivering two image feeds. Such multiple feed arrangements may in certain instances be substantially independent; to continue the example above, one screen might show a computer desktop, while the other shows content substantially unrelated to the desktop (such as a video).

However, in other instances two or more data feeds may be combined or otherwise inter-related in some fashion. For example, left and right image feeds may be arranged in a stereo configuration, so as to present the appearance of three dimensionality. Such an arrangement of left and right feeds might be utilized in a number of devices, processes, etc., for example being incorporated into a head mounted display so as to deliver image content to a viewer.

Where feeds are presented in some inter-related fashion, it may be useful to control certain specifics regarding the manner in which the two feeds are displayed, such as the brightness of the feeds, the manner and/or degree of inter-relation between the feeds, etc. Such control may for example facilitate delivery of information via the feeds, and potentially interaction with and/or control of devices, systems, etc. based on information delivery. As a more concrete example, such control might facilitate stereo image delivery to a viewer wearing a head mounted display, and input by that viewer to the display or another system in communication therewith in response to the stereo imagery.

BRIEF SUMMARY OF THE INVENTION

The present invention contemplates a variety of systems, apparatus, methods, and paradigms for delivering and controlling multi-feed imagery.

In one embodiment of the present invention, a machine-implemented method is provided that includes, in a processor, establishing a left visual feed, a left visual feed parameter for the left visual feed, a right visual feed, and a right visual feed parameter for the right visual feed, the right feed visual parameter at least substantially corresponding with the left visual feed parameter. The method includes configuring the left visual feed in cooperation with the right visual field so as to define left, central, and right display regions. The left display region includes a first portion of the left visual feed and at least substantially excludes the right visual feed. The right display region includes a first portion of the right visual feed and at least substantially excludes the left visual feed. The a central display region includes a second portion of the left visual feed in stereo cooperation with a second portion of the right visual feed. The method also includes outputting the left and right visual feeds.

In another embodiment of the present invention, a machine-implemented method is provided that includes, in a processor, establishing a left visual feed, a left visual feed parameter for the left visual feed, a right visual feed, and a right visual feed parameter for the right visual feed, the right feed visual parameter at least substantially corresponding with the left visual feed parameter. The method includes configuring the left visual feed in cooperation with the right visual field so as to define left, central, and right display regions. The left display region includes a first portion of the left visual feed and at least substantially excludes the right visual feed; a visual display parameter in the left display region includes the left visual feed parameter in the first portion of the left visual feed. The right display region includes a first portion of the right visual feed and at least substantially excludes the left visual feed; the visual display parameter in the right display region includes the right visual feed parameter in the first portion of the right visual feed. The central display region includes a second portion of the left visual feed in stereo cooperation with a second portion of the right visual feed; the visual display parameter in the right display region includes a sum of the left feed visual parameter in the second portion of the left visual feed and the right feed visual parameter in the second portion of the right feed. The method also includes establishing a scaling target for the visual display parameter in at least one of the left display region, central display region, and right display region, and establishing a left scaling profile for the left visual feed parameter in the left visual feed and a right scaling profile for the right visual feed parameter in the right visual feed, such that the scaled left visual feed parameter of the left visual feed and the scaled right visual feed parameter of the right visual feed cooperate to at least substantially achieve the scaling target for the visual display parameter. The method further includes scaling the left visual feed parameter in the left visual feed according to the left scaling profile, scaling the right visual feed parameter in the right visual feed according to the right scaling profile, and outputting the left and right visual feeds so scaled.

The left and right visual feed parameters may be left and right brightness distributions. The left feed visual feed parameter may be a left color channel brightness distribution, and the right visual feed parameter may be a corresponding right color channel distribution. The left and right visual feed parameters may be left and right contrast distributions. The left and right visual feed parameters may be dynamic range distributions.

The scaling target may include the visual display parameter being at least substantially uniform in at least one of the left, central, and right display regions. The scaling target may include the visual display parameter being at least substantially uniform in all of the left, central, and right display regions. The scaling target may include the visual display parameter being at least substantially uniform proximate a left transition between the left and central display regions and proximate a right transition between the central and right display regions.

The scaling target may include the visual display parameter being at least substantially smooth in at least one of the left, central, and right display regions. The scaling target may include the visual display parameter being at least substantially smooth in all of the left, central, and right display regions. The scaling target may include the visual display parameter being at least substantially smooth proximate a left transition between the left and central display regions and proximate a right transition between the central and right display regions.

The scaling target may include the visual display parameter being at least substantially continuous in at least one of the left, central, and right display regions. The scaling target may include the visual display parameter being at least substantially continuous in all of the left, central, and right display regions. The scaling target may include the visual display parameter being at least substantially continuous proximate a left transition between the left and central display regions and proximate a right transition between the central and right display regions.

The scaling target may include the visual display parameter being greater in magnitude in the central display region than the left and right display regions.

The left visual feed parameter may be at least substantially different in magnitude from the right visual parameter, with the scaling target for the visual display parameter in the central display region proximate the left display region at least substantially matching in magnitude the visual display region in the left display region, and the visual display parameter in the central display region proximate the right display region at least substantially matching in magnitude the visual display region in the right display region.

The left scaling profile may include a substantially instantaneous decrease in the left visual feed parameter at least substantially aligned with a left boundary between the first and second portions of the left visual feed, and the right scaling profile may include a substantially instantaneous decrease in the right visual feed parameter at least substantially aligned with a right boundary between the first and second portions of the right visual feed.

The left scaling profile may include a substantially instantaneous decrease in the left visual feed parameter of at least approximately 50% at least substantially aligned with a left boundary between the first and second portions of the left visual feed, and the right scaling profile may include a substantially instantaneous decrease in the right visual feed parameter of at least approximately 50% at least substantially aligned with a right boundary between the first and second portions of the right visual feed.

The left scaling profile may include a substantially linear decrease in the left visual feed parameter initiating at least substantially in alignment with a left boundary between the first and second portions of the left visual feed, and the right scaling profile may include a substantially linear decrease in the right visual feed parameter initiating at least substantially in alignment with a right boundary between the first and second portions of the right visual feed.

The left scaling profile may include: between a left boundary between the first and second portions of the left visual feed and a first distance from the left boundary, the left visual feed parameter decreases at least substantially increasingly; and between the first distance from the left boundary and an edge of the second portion of the left feed distal from the left boundary, the left visual feed parameter decreases at least substantially decreasingly. The right scaling profile may include: between a right boundary between the first and second portions of the right visual feed and a first distance from the right boundary, the right visual feed parameter decreases at least substantially increasingly; and between the first distance from the right boundary and an edge of the second portion of the right feed distal from the right boundary, the right visual feed parameter decreases at least substantially decreasingly.

The left scaling profile may include: between a left boundary between the first and second portions of the left visual feed and a first distance from the left boundary, the left visual feed parameter decreases at least substantially increasingly; between the first distance from the left boundary and a second distance from the left boundary, the left visual feed parameter decreases at least substantially linearly; between the second distance from the left boundary and an edge of the second portion of the left feed distal from the left boundary, the left visual feed parameter decreases at least substantially decreasingly. The right scaling profile may include: between a right boundary between the first and second portions of the right visual feed and a first distance from the right boundary, the right visual feed parameter decreases at least substantially increasingly; and between the first distance from the right boundary and a second distance from the right boundary, the right visual feed parameter decreases at least substantially linearly; and between the second distance from the right boundary and an edge of the second portion of the right feed distal from the right boundary, the right visual feed parameter decreases at least substantially decreasingly.

The left scaling profile may include: between a first distance from a left boundary between the first and second portions of the left visual feed and a second distance from the left boundary, the left visual feed parameter decreases at least substantially increasingly; between a third distance from the left boundary and a fourth distance from the left boundary, the left visual feed parameter decreases at least substantially linearly; and between a fifth distance from the left boundary and a sixth distance from the left boundary, the left visual feed parameter decreases at least substantially decreasingly. The right scaling profile may include: between a first distance from a right boundary between the first and second portions of the right visual feed and a second distance from the right boundary, the right visual feed parameter decreases at least substantially increasingly; between a third distance from the right boundary and a fourth distance from the right boundary, the right visual feed parameter decreases at least substantially linearly; and between a fifth distance from the right boundary and a sixth distance from the right boundary, the right visual feed parameter decreases at least substantially decreasingly.

The left scaling profile may include: between a left boundary between the first and second portions of the left visual feed and a first distance from the left boundary, the left visual feed parameter decreases at least substantially increasingly; between the first distance from the left boundary and a second distance from the left boundary, the left visual feed parameter decreases at least substantially decreasingly; between the second distance from the left boundary and a third distance from the left boundary, the left visual feed parameter decreases at least substantially increasingly; and between the third distance from the left boundary and an edge of the second portion of the left feed distal from the left boundary, the left visual feed parameter decreases at least substantially decreasingly. The right scaling profile may include: between a right boundary between the first and second portions of the right visual feed and a first distance from the right boundary, the right visual feed parameter decreases at least substantially increasingly; between the first distance from the right boundary and a second distance from the right boundary, the right visual feed parameter decreases at least substantially decreasingly; between the second distance from the right boundary and a third distance from the right boundary, the right visual feed parameter decreases at least substantially increasingly; and between the third distance from the right boundary and an edge of the second portion of the right feed distal from the right boundary, the right visual feed parameter decreases at least substantially decreasingly.

The left scaling profile may include: between a first distance from a left boundary between the first and second portions of the left visual feed and a second distance from the left boundary, the left visual feed parameter decreases at least substantially increasingly; between the second distance from the left boundary and a third distance from the left boundary, the left visual feed parameter decreases at least substantially decreasingly; between the third distance from the left boundary and a fourth distance from the left boundary, the left visual feed parameter is at least substantially uniform; between the fourth distance from the left boundary and a fifth distance from the left boundary, the left visual feed parameter decreases at least substantially increasingly; and between the fifth distance from the left boundary and a sixth distance from the left boundary, the left visual feed parameter decreases at least substantially decreasingly. The right scaling profile may include: between a first distance from a right boundary between the first and second portions of the right visual feed and a second distance from the right boundary, the right visual feed parameter decreases at least substantially increasingly; between the second distance from the right boundary and a third distance from the right boundary, the right visual feed parameter decreases at least substantially decreasingly; between the third distance from the right boundary and a fourth distance from the right boundary, the right visual feed parameter is at least substantially uniform; between the fourth distance from the right boundary and a fifth distance from the right boundary, the right visual feed parameter decreases at least substantially increasingly; and between the fifth distance from the right boundary and a sixth distance from the right boundary, the right visual feed parameter decreases at least substantially decreasingly.

The left scaling profile may include: between a first distance from a left boundary between the first and second portions of the left visual feed and a second distance from the left boundary, the left visual feed parameter decreases at least substantially increasingly; between the second distance from the left boundary and a third distance from the left boundary, the left visual feed parameter decreases at least substantially linearly; between the third distance from the left boundary and a fourth distance from the left boundary, the left visual feed parameter decreases at least substantially decreasingly; between the fourth distance from the left boundary and a fifth distance from the left boundary, the left visual feed parameter is at least substantially uniform; between the fifth distance from the left boundary and a sixth distance from the left boundary, the left visual feed parameter decreases at least substantially increasingly; between the sixth distance from the left boundary and a seventh distance from the left boundary, the left visual feed parameter decreases at least substantially linearly; and between the seventh distance from the left boundary and an eighth distance from the left boundary, the left visual feed parameter decreases at least substantially decreasingly. The right scaling profile may include: between a first distance from a right boundary between the first and second portions of the right visual feed and a second distance from the right boundary, the right visual feed parameter decreases at least substantially increasingly; between the second distance from the right boundary and a third distance from the right boundary, the right visual feed parameter decreases at least substantially linearly; between the third distance from the right boundary and a fourth distance from the right boundary, the right visual feed parameter decreases at least substantially decreasingly; between the fourth distance from the right boundary and a fifth distance from the right boundary, the right visual feed parameter is at least substantially uniform; between the fifth distance from the right boundary and a sixth distance from the right boundary, the right visual feed parameter decreases at least substantially increasingly; between the sixth distance from the right boundary and a seventh distance from the right boundary, the right visual feed parameter decreases at least substantially linearly; and between the seventh distance from the right boundary and an eighth distance from the right boundary, the right visual feed parameter decreases at least substantially decreasingly.

The left scaling profile may include: between a left boundary between the first and second portions of the left visual feed and a first distance from the left boundary, the left visual feed parameter decreases at least substantially quadratically increasingly; and between the first distance from the left boundary and an edge of the second portion of the left feed distal from the left boundary, the left visual feed parameter decreases at least substantially quadratically decreasingly. The right scaling profile may include: between a right boundary between the first and second portions of the right visual feed and a first distance from the right boundary, the right visual feed parameter decreases at least substantially quadratically increasingly; and between the first distance from the right boundary and an edge of the second portion of the right feed distal from the right boundary, the right visual feed parameter decreases at least substantially quadratically decreasingly.

The left scaling profile may include: between a left boundary between the first and second portions of the left visual feed and a first distance from the left boundary, the left visual feed parameter decreases at least substantially quadratically increasingly; between the first distance from the left boundary and a second distance from the left boundary, the left visual feed parameter decreases at least substantially linearly; between the second distance from the left boundary and an edge of the second portion of the left feed distal from the left boundary, the left visual feed parameter decreases at least substantially quadratically decreasingly. The right scaling profile may include: between a right boundary between the first and second portions of the right visual feed and a first distance from the right boundary, the right visual feed parameter decreases at least substantially quadratically increasingly; between the first distance from the right boundary and a second distance from the right boundary, the right visual feed parameter decreases at least substantially linearly; and between the second distance from the right boundary and an edge of the second portion of the right feed distal from the right boundary, the right visual feed parameter decreases at least substantially quadratically decreasingly.

The left scaling profile may include: between a first distance from a left boundary between the first and second portions of the left visual feed and a second distance from the left boundary, the left visual feed parameter decreases at least substantially quadratically increasingly; between a third distance from the left boundary and a fourth distance from the left boundary, the left visual feed parameter decreases at least substantially linearly; and between a fifth distance from the left boundary and a sixth distance from the left boundary, the left visual feed parameter decreases at least substantially quadratically decreasingly. The right scaling profile may include: between a first distance from a right boundary between the first and second portions of the right visual feed and a second distance from the right boundary, the right visual feed parameter decreases at least substantially quadratically increasingly; between a third distance from the right boundary and a fourth distance from the right boundary, the right visual feed parameter decreases at least substantially linearly; and between a fifth distance from the right boundary and a sixth distance from the right boundary, the right visual feed parameter decreases at least substantially quadratically decreasingly.

The left scaling profile may include: between a left boundary between the first and second portions of the left visual feed and a first distance from the left boundary, the left visual feed parameter decreases at least substantially quadratically increasingly; between the first distance from the left boundary and a second distance from the left boundary, the left visual feed parameter decreases at least substantially quadratically decreasingly; between the second distance from the left boundary and a third distance from the left boundary, the left visual feed parameter decreases at least substantially quadratically increasingly; and between the third distance from the left boundary and an edge of the second portion of the left feed distal from the left boundary, the left visual feed parameter decreases at least substantially quadratically decreasingly. The right scaling profile may include: between a right boundary between the first and second portions of the right visual feed and a first distance from the right boundary, the right visual feed parameter decreases at least substantially quadratically increasingly; between the first distance from the right boundary and a second distance from the right boundary, the right visual feed parameter decreases at least substantially quadratically decreasingly; between the second distance from the right boundary and a third distance from the right boundary, the right visual feed parameter decreases at least substantially quadratically increasingly; and between the third distance from the right boundary and an edge of the second portion of the right feed distal from the right boundary, the right visual feed parameter decreases at least substantially quadratically decreasingly.

The left scaling profile may include: between a first distance from a left boundary between the first and second portions of the left visual feed and a second distance from the left boundary, the left visual feed parameter decreases at least substantially quadratically increasingly; between the second distance from the left boundary and a third distance from the left boundary, the left visual feed parameter decreases at least substantially quadratically decreasingly; between the third distance from the left boundary and a fourth distance from the left boundary, the left visual feed parameter is at least substantially uniform; between the fourth distance from the left boundary and a fifth distance from the left boundary, the left visual feed parameter decreases at least substantially quadratically increasingly; and between the fifth distance from the left boundary and a sixth distance from the left boundary, the left visual feed parameter decreases at least substantially quadratically decreasingly. The right scaling profile may include between a first distance from a right boundary between the first and second portions of the right visual feed and a second distance from the right boundary, the right visual feed parameter decreases at least substantially quadratically increasingly; between the second distance from the right boundary and a third distance from the right boundary, the right visual feed parameter decreases at least substantially quadratically decreasingly; between the third distance from the right boundary and a fourth distance from the right boundary, the right visual feed parameter is at least substantially uniform; between the fourth distance from the right boundary and a fifth distance from the right boundary, the right visual feed parameter decreases at least substantially quadratically increasingly; and between the fifth distance from the right boundary and a sixth distance from the right boundary, the right visual feed parameter decreases at least substantially quadratically decreasingly.

The left scaling profile may include: between a first distance from a left boundary between the first and second portions of the left visual feed and a second distance from the left boundary, the left visual feed parameter decreases at least substantially quadratically increasingly; between the second distance from the left boundary and a third distance from the left boundary, the left visual feed parameter decreases at least substantially linearly; between the third distance from the left boundary and a fourth distance from the left boundary, the left visual feed parameter decreases at least substantially quadratically decreasingly; between the fourth distance from the left boundary and a fifth distance from the left boundary, the left visual feed parameter is at least substantially uniform; between the fifth distance from the left boundary and a sixth distance from the left boundary, the left visual feed parameter decreases at least substantially quadratically increasingly; between the sixth distance from the left boundary and a seventh distance from the left boundary, the left visual feed parameter decreases at least substantially linearly; and between the seventh distance from the left boundary and an eighth distance from the left boundary, the left visual feed parameter decreases at least substantially quadratically decreasingly. The right scaling profile may include: between a first distance from a right boundary between the first and second portions of the right visual feed and a second distance from the right boundary, the right visual feed parameter decreases at least substantially quadratically increasingly; between the second distance from the right boundary and a third distance from the right boundary, the right visual feed parameter decreases at least substantially linearly; between the third distance from the right boundary and a fourth distance from the right boundary, the right visual feed parameter decreases at least substantially quadratically decreasingly; between the fourth distance from the right boundary and a fifth distance from the right boundary, the right visual feed parameter is at least substantially uniform; between the fifth distance from the right boundary and a sixth distance from the right boundary, the right visual feed parameter decreases at least substantially quadratically increasingly; between the sixth distance from the right boundary and a seventh distance from the right boundary, the right visual feed parameter decreases at least substantially linearly; and between the seventh distance from the right boundary and an eighth distance from the right boundary, the right visual feed parameter decreases at least substantially quadratically decreasingly.

The method may include scaling the left visual feed parameter of the left visual feed and the right visual feed parameter of the right visual feed at least substantially mutually mirrored.

The left scaling profile may average approximately 50% of the left visual feed parameter, and the right scaling profile may average approximately 50% of the right visual feed parameter.

The method may include scaling the left visual feed parameter in the second portion of the left visual feed by applying a left filter thereto, and scaling the right visual feed parameter in the second portion of the right visual feed by applying a right filter thereto. The left and right filters may be virtual filters. The left and right filters may be physical filters. The left and right filters may adjustable in degree of scaling. The left and right filters may be virtual adjustable in position relative to the right visual feed. The left and right filters may be spatially non-uniform in degree of scaling.

In another embodiment of the present invention, an apparatus is provided that includes a processor; a visual feed establisher, a visual feed configurer, and a visual feed outputter all including executable instructions instantiated on the processor; and left and right visual displays in communication with the processor. The visual feed establisher is adapted to establish left and right visual feeds. The visual feed configurer is adapted to configure the left and right visual feeds as a left display region, a central display region, and a right display region. The left display region is at least substantially non-stereo, includes a first portion of the left visual feed, and at least substantially excludes the right visual feed. The right display region is at least substantially non-stereo, includes a first portion of the right visual feed, and at least substantially excludes the left visual feed. The central display region is at least substantially stereo and includes a second portion of the left visual feed in stereo cooperation with a second portion of the right visual feed. The visual feed outputter is adapted to deliver the left and right visual feeds to left and right visual displays respectively at least substantially as configured by the visual feed configure. The left and right visual displays are adapted to display the left and right visual feeds respectively, at least substantially as configured by the visual feed configurer.

In another embodiment of the present invention, an apparatus is provided that includes a processor; a visual feed establisher, a visual feed parameter establisher, a visual feed configure, a visual feed parameter scaling establisher, a visual feed parameter scaler, and a visual feed outputter, all including executable instructions instantiated on the processor; and left and right visual displays in communication with the processor. The visual feed establisher is adapted to establish left and right visual feeds. The visual feed parameter establisher is adapted to establish a left and right visual feed parameters of the left and right visual feeds respectively. The visual feed configurer is adapted to configure the left and right visual feeds as a left display region, a central display region, and a right display region. The left display region is at least substantially non-stereo, includes a first portion of the left visual feed, and at least substantially excludes the right visual feed, wherein a visual display parameter in the left display region includes the left visual feed parameter in the first portion of the left visual feed. The right display region is at least substantially non-stereo, includes a first portion of the right visual feed, and at least substantially excludes the left visual feed, wherein the visual display parameter in the right display region includes the right visual feed parameter in the first portion of the right visual feed. The central display region is at least substantially stereo and includes a second portion of the left visual feed in stereo cooperation with a second portion of the right visual feed, wherein the visual display parameter in the right display region includes a sum of the left feed visual parameter in the second portion of the left visual feed and the right feed visual parameter in the second portion of the right feed. The visual feed parameter scaling establisher is adapted to establish a scaling target for the visual display parameter in at least one of the left, central, and right display regions, and to establish a left scaling profile for the left visual feed parameter in the left visual feed and a right scaling profile for the right visual feed parameter in the right visual feed so as to at least substantially achieve the scaling target. The visual feed parameter scaler is adapted to scale the left visual feed parameter in the left visual feed and the right visual feed parameter in the right visual feed at least substantially according to the left and right scaling profiles respectively. The visual feed outputter is adapted to deliver left and right scaled visual feeds to left and right visual displays respectively at least substantially as configured by the visual feed configure. The left and right visual displays are adapted to display the left and right scaled visual feeds respectively, at least substantially as configured by the visual feed configurer.

The left and right visual feed parameters may be left and right brightness distributions.

The visual feed parameter scaler may include left and right virtual filters, the left filter being adapted to scale the left visual feed parameter of the left visual feed at least substantially as data, and the right filter being adapted to scale the right visual feed parameter of the right visual feed at least substantially as data. The visual feed parameter scaler may include left and right physical filters, the left filter being adapted to scale the left visual feed parameter of the left visual feed at least substantially optically, and the right filter being adapted to scale the right visual feed parameter of the right visual feed at least substantially optically.

The left and right visual displays may be virtual see-through displays. The left and right visual displays may be optical see-through displays. The left and right visual displays may be opaque displays.

The apparatus may include a body adapted to be worn on a head, with the left and right visual displays being engaged with the body such that when the body is worn on the head the left visual display is disposed proximate, at least substantially facing, and at least substantially in front of a left eye of the head, and the right visual display is disposed proximate, at least substantially facing, and at least substantially in front of a right eye of the head.

In another embodiment of the present invention, a machine-implemented method is provided that includes, in a processor, establishing a left visual feed, establishing a left brightness parameter for the left visual feed, establishing a right visual feed, and establishing a right brightness distribution for the right visual feed. The method includes configuring the left visual feed in cooperation with the right visual field so as to define left, right, and central display regions. The left display region includes a first portion of the left visual feed and at least substantially excludes the right visual feed, wherein a display brightness distribution in the left display region includes the left brightness distribution in the first portion of the left visual feed. The right display region includes a first portion of the right visual feed and at least substantially excludes the left visual feed, wherein the display brightness distribution in the right display region includes the right brightness distribution in the first portion of the right visual feed. The central display region includes a second portion of the left visual feed in stereo cooperation with a second portion of the right visual feed, wherein the display brightness distribution in the right display region includes a sum of the left brightness distribution in the second portion of the left visual feed and the right brightness distribution in the second portion of the right feed. The method also includes establishing a scaling target for the display brightness distribution in the left display region, the central display region, and the right display region, the scaling target including the display brightness distribution being at least substantially uniform in the left, central, and right display regions. The method further includes establishing a left scaling profile for the left brightness distribution and a right scaling profile for the right brightness distribution, such that a scaled left brightness distribution and a scaled right brightness distribution cooperate to at least substantially achieve the scaling target for the display brightness distribution. The left scaling profile includes:

between a left boundary between the first and second portions of the left visual feed and a first distance from the left boundary, the left brightness distribution decreases at least substantially quadratically increasingly; between the first distance from the left boundary and a second distance from the left boundary, the left brightness distribution decreases at least substantially quadratically decreasingly; between the second distance from the left boundary and a third distance from the left boundary, the left brightness distribution is at least substantially uniform; between the third distance from the left boundary and a fourth distance from the left boundary, the left brightness distribution decreases at least substantially quadratically increasingly; and between the fourth distance from the left boundary and an edge of the second portion of the left feed distal from the left boundary, the left brightness distribution decreases at least substantially quadratically decreasingly. The right scaling profile includes: between a right boundary between the first and second portions of the right visual feed and a first distance from the right boundary, the right brightness distribution decreases at least substantially quadratically increasingly; between the first distance from the right boundary and a second distance from the right boundary, the right brightness distribution decreases at least substantially quadratically decreasingly; between the second distance from the right boundary and a third distance from the right boundary, the right brightness distribution is at least substantially uniform; between the third distance from the right boundary and a fourth distance from the right boundary, the right brightness distribution decreases at least substantially quadratically increasingly; and between the fourth distance from the right boundary and an edge of the second portion of the right feed distal from the right boundary, the right brightness distribution decreases at least substantially quadratically decreasingly. The method further includes scaling the left brightness distribution according to the left scaling profile, scaling the right brightness distribution according to the right scaling profile, and outputting the left and right visual feeds so scaled.

In another embodiment of the present invention, an apparatus is provided that includes a body adapted to be worn on a head, and a processor disposed on the body. The apparatus includes a visual feed establisher, a brightness distribution establisher, a visual feed configure, a brightness distribution scaling establisher, a brightness distribution scaler, and a visual feed outputter, all including executable instructions instantiated on the processor. The apparatus further includes an optically see-through left visual display disposed on the body and in communication with the processor, and an optically see-through right visual display disposed on the body and in communication with the processor. The left and right visual displays are engaged with the body such that when the body is worn on the head the left visual display is disposed proximate, at least substantially facing, and at least substantially in front of a left eye of the head, and the right visual display is disposed proximate, at least substantially facing, and at least substantially in front of a right eye of the head. The visual feed establisher is adapted to establish left and right visual feeds. The visual feed parameter establisher is adapted to establish a left and right brightness distributions of the left and right visual feeds respectively. The visual feed configurer is adapted to configure the left and right visual feeds as a left display region, a central display region, and a right display region. The left display region is at least substantially non-stereo, includes a first portion of the left visual feed, and at least substantially excludes the right visual feed, wherein a display brightness distributions in the left display region includes the left brightness distribution in the first portion of the left visual feed. The right display region is at least substantially non-stereo, includes a first portion of the right visual feed, and at least substantially excludes the left visual feed, wherein the visual display parameter in the right display region includes the right brightness distribution in the first portion of the right visual feed. The central display region is at least substantially stereo and includes a second portion of the left visual feed in stereo cooperation with a second portion of the right visual feed, wherein the visual display parameter in the right display region includes a sum of the left brightness distribution in the second portion of the left visual feed and the right brightness distribution in the second portion of the right feed. The brightness distribution scaling establisher is adapted to establish a scaling target for the display brightness distribution in the left, central, and right display regions, the scaling target including the display brightness distribution being at least substantially uniform in the left, central, and right display regions. The brightness distribution scaling establisher is further adapted to establish a left scaling profile for the left brightness distribution in the left visual feed and a right scaling profile for the right brightness distribution in the right visual feed so as to at least substantially achieve the scaling target. The left scaling profile includes: between a left boundary between the first and second portions of the left visual feed and a first distance from the left boundary, the left brightness distribution decreases at least substantially quadratically increasingly; between the first distance from the left boundary and a second distance from the left boundary, the left brightness distribution decreases at least substantially quadratically decreasingly; between the second distance from the left boundary and a third distance from the left boundary, the left brightness distribution is at least substantially uniform; between the third distance from the left boundary and a fourth distance from the left boundary, the left brightness distribution decreases at least substantially quadratically increasingly; and between the fourth distance from the left boundary and an edge of the second portion of the left feed distal from the left boundary, the left brightness distribution decreases at least substantially quadratically decreasingly. The right scaling profile includes: between a right boundary between the first and second portions of the right visual feed and a first distance from the right boundary, the right brightness distribution decreases at least substantially quadratically increasingly; between the first distance from the right boundary and a second distance from the right boundary, the right brightness distribution decreases at least substantially quadratically decreasingly; between the second distance from the right boundary and a third distance from the right boundary, the right brightness distribution is at least substantially uniform; between the third distance from the right boundary and a fourth distance from the right boundary, the right brightness distribution decreases at least substantially quadratically increasingly; and between the fourth distance from the right boundary and an edge of the second portion of the right feed distal from the right boundary, the right brightness distribution decreases at least substantially quadratically decreasingly. The brightness distribution scaler is adapted to scale the left brightness distribution in the left visual feed and the right brightness distribution in the right visual feed at least substantially according to the left and right scaling profiles respectively. The visual feed outputter is adapted to deliver left and right scaled visual feeds to left and right visual displays respectively at least substantially as configured by the visual feed configure. The left and right visual displays are adapted to display the left and right scaled visual feeds respectively, at least substantially as configured by the visual feed configurer.

In another embodiment of the present invention, an apparatus is provided that includes, means for establishing left and right visual feeds, means for establishing left and right visual feed parameters of the left and right visual feeds respectively, and means for configuring the left and right visual feeds as a left display region, a central display region, and a right display region. The left display region is at least substantially non-stereo, includes a first portion of the left visual feed, and at least substantially excludes the right visual feed, wherein a visual display parameter in the left display region includes the left visual feed parameter in the first portion of the left visual feed. The right display region is at least substantially non-stereo, includes a first portion of the right visual feed, and at least substantially excludes the left visual feed, wherein the visual display parameter in the right display region includes the right visual feed parameter in the first portion of the right visual feed. The central display region is at least substantially stereo and includes a second portion of the left visual feed in stereo cooperation with a second portion of the right visual feed, wherein the visual display parameter in the right display region includes a sum of the left feed visual parameter in the second portion of the left visual feed and the right feed visual parameter in the second portion of the right feed.

The apparatus also includes means for establishing a scaling target for the visual display parameter in at least one of the left, central, and right display regions, means for establishing a left scaling profile for the left visual feed parameter in the left visual feed and a right scaling profile for the right visual feed parameter in the right visual feed so as to at least substantially achieve the scaling target, means for scaling the left visual feed parameter in the left visual feed and the right visual feed parameter in the right visual feed at least substantially according to the left and right scaling profiles respectively, and means for outputting the left and right scaled visual feeds at least substantially as configured by the visual feed configurer.

BRIEF DESCRIPTION OF THE SEVERAL VIEWS OF THE DRAWINGS

Like reference numbers generally indicate corresponding elements in the figures.

FIG. 19 shows example left and right visual fields with brightness distributions substantially decreasing at an increasing rate, then at a decreasing rate, then again at an increasing rate, then again at a decreasing rate, and brightness distributions of display regions associated therewith, according to the present invention.

FIG. 20 shows example left and right visual fields with brightness distributions substantially decreasing at an increasing rate, then at a decreasing rate, then remaining level, then again at an increasing rate, then decreasing again at a decreasing rate, and brightness distributions of display regions associated therewith, according to the present invention.

FIG. 21 shows example left and right visual fields with brightness distributions substantially decreasing at an increasing rate, then at a linear rate, and brightness distributions of display regions associated therewith, according to the present invention.

DETAILED DESCRIPTION OF THE INVENTION

Figure 1:
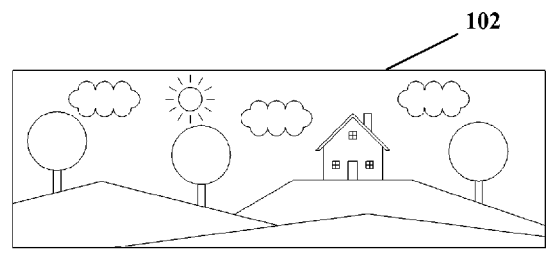
FIG. 1 shows an example of a visual feed.

With reference to FIG. 1, an example of a visual feed 102 is shown therein. More particularly, as shown in FIG. 1 the visual feed 102 represents a still or animated visual image showing content therein, e.g. a house, landscape, trees, clouds, sun, etc. Such feed might be viewed on a display such as an LCD, LED, OLED, plasma, CRT, etc., for example a display disposed on a monitor, television, smart phone, head mounted display, etc. However, the present invention is not particularly limited with regard to specific feeds, displays, devices, etc.

Figure 2:
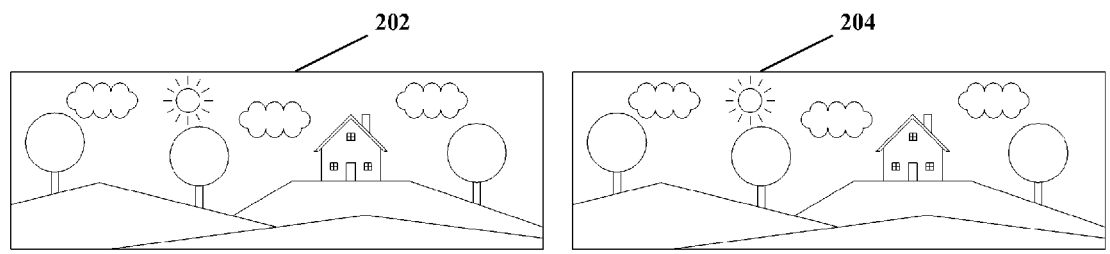
FIG. 2 shows an example of left and right visual feeds configured for full stereo display.

Now with reference to FIG. 2, an example of multiple visual feeds, specifically a left feed 202 and a right feed 204, is shown therein. Left and right visual feeds 202 and 204 may be presented in conjunction for a variety of applications. For purposes of explanation, the left and right feeds 202 and 204 shown in FIG. 2 are described as being presented for stereo display, so as to produce the appearance of three dimensional visual content. However, this is an example only; the present invention is not limited only to stereo visual content, to visual content particularly, or even necessarily to left and right feeds (as opposed to other first feeds, second feeds, third feeds, etc.).

It is noted that for a true stereo display, the left and right visual feeds 202 and 204 may appear at least slightly different, representing an appearance of content therein from slightly different perspectives. For simplicity and clarity, such variations of perspective are not illustrated herein, and the content shown in the left and right feeds 202 and 204 is illustrated as being substantially identical. The illustration of identical content in left and right feeds 202 and 204 (and likewise in certain other figures herein) may more clearly reveal certain features of the present invention with regard to examples of spatial combination of images, and in addition may avoid confusion associated with attempting to present actual stereo imagery in a non-stereo format (i.e. two-dimensional images on printed pages).

Figure 3:
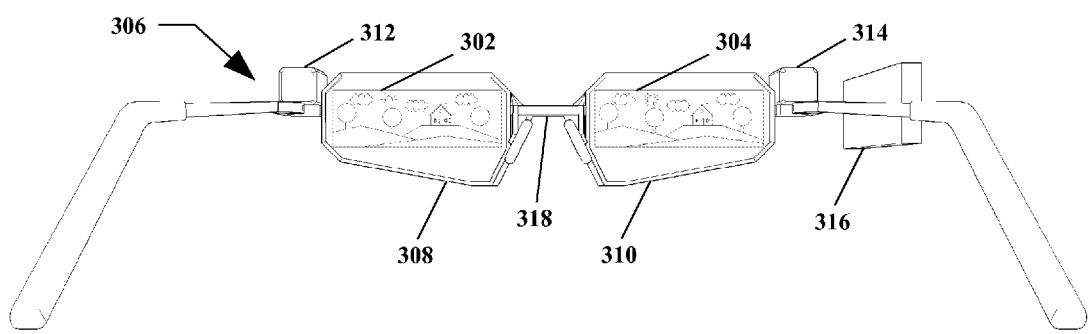
FIG. 3 shows an example apparatus according to the present invention displaying left and right visual feeds thereon in a full stereo configuration.

Turning to FIG. 3, left and right visual feeds 302 and 304—at least somewhat similar to left and right visual feeds 202 and 204 in FIG. 2—are shown as outputted in a stereo configuration, via a head mounted display 306 taking a form similar to a pair of glasses. In the example arrangement of FIG. 3, the left visual feed 302 is outputted to a left display 308, and the right visual feed to a right display 310, the left and right displays 308 and 310 being disposed on a body 318 resembling a pair of glasses. Given such a body 318, when the head mounted display 306 is worn the left and right displays 308 and 310 would be disposed at least substantially in front of, facing, and proximate the left and right eyes of a viewer (not shown). With the head mounted display 306 so worn, the left and right visual feeds 302 and 304 would cooperate to produce a stereo view, giving the appearance of three dimensionality to the contents of the left and right visual feeds 302 and 304.

A processor 316 disposed on the body 318 may control and/or configure at least certain features of the left and right visual feeds 302 and 304. Left and right cameras 312 and 314 also may be disposed on the body 306, for example so as to capture visual imagery of the surrounding environment (e.g. so as to support augmented reality, with computer-generated content displayed in association with physical content from the environment, etc.). Other elements and/or features may be disposed on such a head mounted display 306, and the present invention is not particularly limited with regard to the features, arrangement, etc. of a head mounted display or other device. The head mounted display 306 in FIG. 3 is presented as an example only, and other arrangements may be equally suitable.

For the arrangements shown in FIG. 2 and FIG. 3, it should be understood that substantially the entirety of the content as delivered via the left and right visual feeds may present in a stereo arrangement. That is, the entire combined left and right visual feeds as seen by a viewer will appear to be three dimensional.

Figure 4:
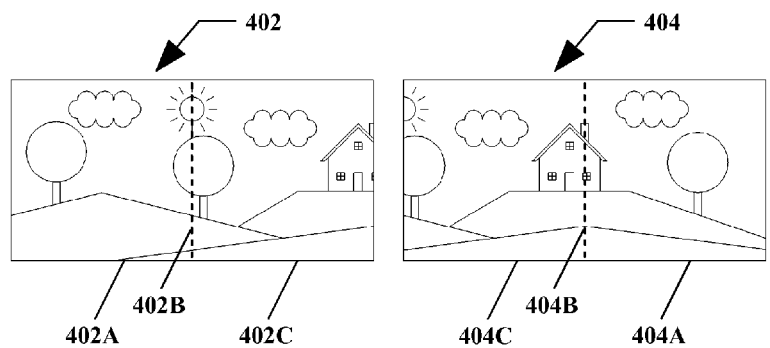
FIG. 4 shows an example of left and right visual feeds configured for partial stereo display according to the present invention.

Turning to FIG. 4, an example of left and right visual feeds 402 and 404 as configured for partial stereo display thereof is shown. The left visual feed 402 has a first portion 402A, a second portion 402C, and a boundary 402B therebetween. The right visual feed 404 has a first portion 404A, a second portion 404C, and a boundary 404B therebetween. It is pointed out that the first portions 402A and 404A may be described as "outward"; that is, the first portion 402A of the left feed 402 is left of the boundary 402B in the left feed 402, while the first portion 404A of the right feed 404 is right of the boundary 404B in the right feed 404. The second portions 402C and 404C similarly may be described as "inward". (The boundaries 402B and 404B are indicated in FIG. 4 by dashed lines for clarity; in practice the boundaries 402B and 404B may not necessarily be visible.)

It is noted also that where in FIG. 2 and FIG. 3 substantially the entirety of the content in the left visual feed was present in the right visual feed, and vice versa, the arrangement shown in FIG. 4 differs in that regard. Namely, the content of the second portion 402C of the left visual feed 402 is substantially present within the right visual feed 404 (specifically the second portion 404C thereof), and vice versa; however, the content of the first portion 402A of the left visual feed 402 is substantially not present in the right visual feed 404, and the content of the first portion 404A of the right visual feed 404 is substantially not present in the left visual feed 402. The left and right feeds in FIG. 2 and FIG. 3 substantially entirely duplicate the content of one another; by contrast the left and right feeds 402 and 404 in FIG. 4 duplicate part of the content of one another, but not all of the content of one another; each of the left and right feeds 402 and 404 have content unique thereto (as may be seen, in the first portions 402A and 404A thereof). This feature is explained further with regard to FIG. 5 and FIG. 6.

Figure 5:
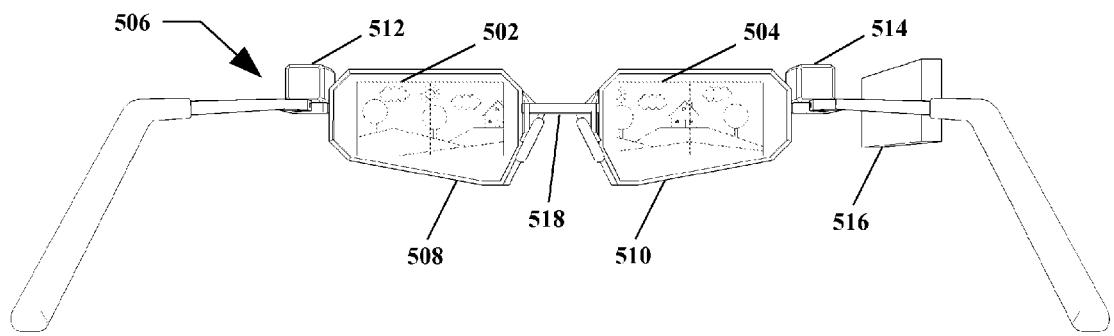
FIG. 5 shows an example apparatus according to the present invention displaying left and right visual feeds thereon in a partial stereo configuration.

With regard to FIG. 5, left and right visual feeds 502 and 504—at least somewhat similar to left and right visual feeds 402 and 404 in FIG. 4—are shown as outputted in a stereo configuration, via a head mounted display 506 taking a form similar to a pair of glasses (at least somewhat similar to the head mounted display 306 in FIG. 3). In the example arrangement of FIG. 5, the left visual feed 502 is outputted to a left display 508, and the right visual feed to a right display 510, the left and right displays 508 and 510 being disposed on a body 518, with a processor 516 and left and right cameras 512 and 514 also disposed on the body 506

With the head mounted display 506 worn, the left and right visual feeds 502 and 504 would cooperate to produce a stereo view, giving the appearance of three dimensionality to part of the contents of the left and right visual feeds 502 and 504. This is described further with regard to FIG. 6.

Figure 6:
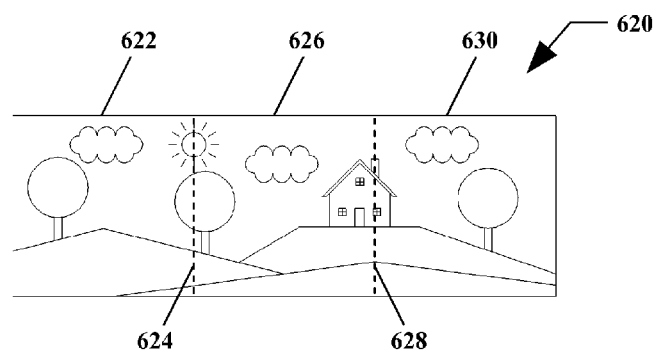
FIG. 6 shows an example of a partial stereo display of left and right visual feeds according to the present invention, indicating non-stereo and stereo display regions therein.

In FIG. 6, the appearance of a configuration of left and right visual feeds at least somewhat similar to those in FIG. 4 and FIG. 5 is shown. More particularly, in FIG. 6 a visual compilation 620 is shown, as may result from delivering a first and second visual feed (e.g. similar to the first and second visual feeds 402 and 404 in FIG. 4) in a configuration with respect to one another (e.g. a configuration similar to that shown for the first and second visual feeds 502 and 504 in FIG. 5).

For a suitable configuration of visual feeds, the compilation 620 in FIG. 6 may result, wherein content may be considered in three display regions: a left display region 622, a central display region 626, and a right display region 630. A left transition 624 may be considered to be defined between the left and central display regions 622 and 626, and a right transition 628 between the central and right display regions 626 and 630. (As with the boundaries 402B and 404B in FIG. 4, the transitions 624 and 628 are represented by dashed lines for clarity, though the transitions 624 and 628 may not necessarily be visible in practice.)

Considering for purposes of explanation that the compilation 620 in FIG. 6 is produced through a configuration of the first and second visual feeds 402 and 404 in FIG. 4 (though this is an example only, and the present invention is not limited thereby), it may be understood that the left display region 622 in FIG. 6 at least substantially includes content from the first portion 402A of the left visual feed 402; the central display region 626 in FIG. 6 at least substantially includes content from the second portion 402C of the left visual feed 402 and content from the second portion 404C of the right visual feed 404; and the right display region at least substantially includes content from the first portion 404A of the right visual feed 404.

Suitably configured, the content from the second portion 402C of the left visual feed 402 may cooperate with the content from the second portion 404C of the right visual feed 404 so as to form a stereo arrangement, such that the central display region 626 may be considered at least substantially stereo. As noted with regard to FIG. 4, the second portion 402C of the left feed 402 and the second portion 404C of the right feed 404 exhibit substantially duplicate content (though as also noted previously, in practice the content may be at least somewhat different, e.g. as being from two slightly different perspectives), supporting stereo combination and enabling the central display region 626 to be at least substantially stereo. However, the left display region 622 in FIG. 6 exhibits at least substantially non-stereo content, at least substantially incorporating substantially unique content in the first portion 402A of the left feed 402 in FIG. 4; similarly the right display region 630 in FIG. 6 exhibits at least substantially non-stereo content, at least substantially incorporating substantially unique content in the first portion 404A of the right feed 404.

More colloquially, for the example arrangement shown in FIG. 6, the left display region 622 is non-stereo with content only from a left feed; the right display region 630 is non-stereo with content only from a right feed; and the central display region 626 is stereo with content from the left and right feeds.

For such an arrangement, only the central display region 626 will exhibit an appearance of three dimensionality from stereo effects; the left and right display regions 622 and 630 will not exhibit three dimensionality from stereo effects, and may appear to be at least substantially two dimensional (assuming as an example left and right feeds that are themselves two dimensional). That is, only part of the content delivered via left and right feeds arranged to produce a compilation 620 may appear to be three dimensional. Such an arrangement may be considered, and is referred to in at least certain instances herein, as "2D/3D/2D": stereo content with non-stereo content to either side.

A 2D/3D/2D arrangement such as that shown in FIG. 6 may exhibit certain advantages under at least some circumstances. As may be understood, a stereo "image" is in fact two images, one left and one right, perceived by left and right eyes (or comparable sensors, etc.) and reassembled in the brain (or likewise comparable systems, etc.) to produce the appearance of three dimensionality. Thus, stereo content typically includes approximately twice as much data as non-stereo content. This implies output of twice as much data for stereo content as for non-stereo content, which in turn implies two-fold generation, storage, transmission, etc. of data, along with consequential increases in required resources such as processing capability, electrical power, data store capacity, heat dissipation capability, etc.

In addition, as may be understood from a comparison of FIG. 3 and FIG. 5, outputting content entirely in stereo as opposed to partially in stereo may necessitate (or at least benefit from) displays that are larger and/or higher in resolution for a given image size and level of image quality. This is because the left and right feeds typically are larger for an all-stereo output than for a partially stereo output. The left and right feeds 502 and 504 in FIG. 5 as observed by inspection include approximately ⅔ as much content area as the left and right feeds 302 and 304 in FIG. 3; however as may be observed also by inspection the total content area being delivered is substantially similar for FIG. 3 and FIG. 5. For a given amount of image area, when outputting full-stereo content it may be necessary to utilize a larger display and/or a display with higher pixel count, and/or to accept that the displayed content may be smaller and/or lower in resolution, than if outputting 2D/3D/2D content according to the present invention. Thus the use of 2D/3D/2D according to the present invention may support reduced physical device/hardware requirements (and/or conversely, greater functionality for a given hardware arrangement), in addition to and/or in place of software and/or processing considerations.

Of course, a 2D/3D/2D arrangement by definition does not exhibit an appearance of three dimensionality throughout the entirety of delivered visual content. However, in practice this may be acceptable, or even unnoticeable. Human perception of depth tends to be best towards the center of the visual field. For at least certain arrangements, it may be expected that a viewer may focus attention primarily or even exclusively towards the middle of displayed content, which for a 2D/3D/2D arrangement according to the present invention exhibits a three dimensional appearance due to stereo effects. In such instance, content displayed to the left and right may be subject to less attention, with the two dimensionality of such content being less noticed, entirely unnoticed, less distracting if noticed, etc.

Furthermore, there is a natural tendency when perceiving some portion of visual content as three dimensional to unconsciously perceive all associated visual content as being three dimensional, even if some such content is not in fact three dimensional. This is at least somewhat analogous to the tendency of humans to perceive their entire field of view as having high resolution and good color definition. In fact the human eye only supports high resolution and good color definition in a narrow cone aligned with the central portion of the retina (sometimes referred to as the foveal vision or foveal visual field). The human eye is physically limited to much decreased fine color distinction and spatial resolution in the peripheral vision as compared with the foveal vision, but the eyes and brain cooperate to produce an unconscious illusion of being able to see color and fine detail throughout the field of view at any moment.

A 2D/3D/2D arrangement according to the present invention enables the exploitation of such advantages with regard to hardware, software, human visual behavior, etc.

Figure 7:
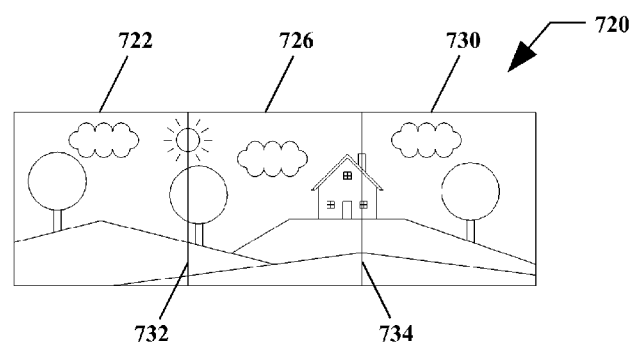
FIG. 7 shows an example of a partial stereo display of left and right visual feeds according to the present invention, indicating visible transitions between non-stereo and stereo display regions therein.

Moving on now to FIG. 7, therein is shown an example of a visual compilation 720 with left, central, and right display regions 722, 726, and 730. As noted previously, transitions between the left and central display regions 722 and 726 and between the central and right display regions 726 and 730 are not necessarily visible, instead representing a transition between non-stereo and stereo content in the visual compilation 720.

However, FIG. 7 shows visible artifacts 732 and 734, in positions at least substantially corresponding with left and right transitions previously described.

When implementing a 2D/3D/2D configuration according to the present invention, in at least certain instances visible artifacts such as those 732 and 734 shown in FIG. 7 may be exhibited. As noted previously, the left display region 722 includes content from a left feed, the right display region 730 includes content from a right feed, and the central display region 726 includes content from both the left and right feeds. Certain properties of the visual feeds may be additive (or otherwise combined). For example, consider a simple example regarding image brightness for a light emitting display, wherein the left and right image feeds have substantially uniform brightness over space. That is, the left and right feeds have substantially the same brightness per unit area across their entirety, and emit approximately the same amount of light per unit area. In such instance, for an arrangement as shown in FIG. 7, as the left and right visual feeds are combined to produce the stereo appearance of three dimensionality, the central display region 726 may under at least certain circumstances appear significantly brighter than the left and right display regions 722 and 730.

For human vision such an apparent brightness difference may be extremely noticeable, even if not necessarily perceived as a brightness difference per se. That is, a viewer might or might not consciously think that the central display region 726 is brighter than the left and/or right display regions 722 and 730, but may nevertheless perceive prominent artifacts 732 and 734 in the form of lines running vertically through the visible content. Whether or not the viewer notices the brightness difference in itself, or notices that the area between the lines (the central display region 726) is three dimensional while the area outside the lines (the left and right display regions 722 and 730), the mere appearance of the lines themselves may prove distracting and/or otherwise be undesirable.

In practice, content in left and right feeds may not exhibit simple uniform brightness. However, artifacts may result even if brightness (or other feed parameters) vary spatially. For example, considering the image content in FIG. 7, the left artifact 732 passes through the landscape, the sky, part of a tree, and the sun. The absolute brightness of the landscape, sky, tree, and sun may be different from one another, and/or may vary over space (and/or over time for an animated image, etc.). However, even though such variations in brightness may exist naturally, the artifact 732 may nevertheless be visible because the brightness to one side of the artifact 732 does not correspond with the brightness on the other side of the artifact 732.

This may be understood by considering a darkened filter, such as might be used in sunglasses, positioned so as to cover some but not all of a person's field of view of the physical world. The physical world varies in brightness over time, space, etc. However, the filter may nevertheless be discerned, and may even be quite prominent, if the patterns, arrangement, etc. of brightness—what might be referred to as the brightness distribution—are different in the area of the filter than in the rest of the field of view. A discontinuity in brightness (for this example) may be visible, that does not correspond with the brightness and/or brightness variations associated with the content itself.

Although colloquially it may be known to refer to overall distributions of brightness in an image as "brightness" singular, as noted brightness may vary in time, space, etc. Thus what may be referred to as "adjusting the brightness" of an image may in fact constitute many adjustments in brightness, e.g. an adjustment in the brightness of each pixel of a pixelated image, and not necessarily in a uniform fashion (i.e. not all pixels may be reduced in brightness by an equal amount, by an equal percentage, etc.). Thus, as a matter of precision, "brightness distribution" may be used in at least some places herein rather than "brightness" alone.

Thus, in at least certain embodiments of the present invention configuring left and right feeds to produce a 2D/3D/2D arrangement may result in visible artifacts due for example to certain visual parameters being perceived differently in stereo and non-stereo display regions. Furthermore, in at least certain embodiments of the present invention is may be advantageous to control certain visual parameters of left and right visual feeds, so as to decrease or eliminate such artifacts, or at least perception of such artifacts.

While the example above refers to brightness and brightness distribution as visual parameters, the present invention is not limited only thereto. Other parameters that may be controlled include, but are not limited to, brightness distribution of individual color channels, contrast distribution, and dynamic range distribution.

Figure 8:
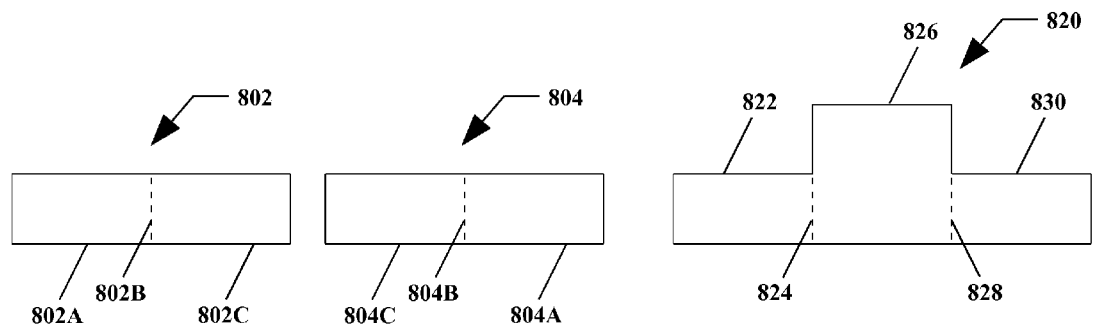
FIG. 8 shows example left and right visual fields with substantially uniform brightness distributions, and brightness distributions of display regions associated therewith, according to the present invention.

Turning now to FIG. 8, therein is presented an example illustration showing a feed parameter across a 2D/3D/2D arrangement according to the present invention. For purposes of description the feed parameter is sometimes referred to herein as brightness or brightness distribution.

Brightness distribution is a type of feed parameter, and the term feed parameter is sometimes used interchangeably in examples. However, as already noted the present invention is not limited only to brightness distribution.

In the arrangement of FIG. 8, left and right visual feeds 802 and 804 are shown. The horizontal dimension of the left and right visual feeds 802 and 804 may be considered to represent spatial width of for example an image. The vertical dimension of the left and right visual feeds 802 and 804 may be considered to represent the brightness distribution; greater vertical dimension thus represents more image brightness, less vertical dimension represents less image brightness. (Spatial height for visual feeds 802 and 804 is not shown.) The left visual feed 802 is further indicated as having first and second portions 802A and 802C, with a boundary 802B defined therebetween. The right visual feed 804 similarly is indicated as having first and second portions 804A and 804C with a boundary 804B defined therebetween.

FIG. 8 also shows a visual compilation 820 resulting from a configuration of the left and right visual feeds 802 and 804 configured according to the present invention so as to produce a 2D/3D/2D arrangement. The compilation 820 is indicated as having a left display region 822, a central display region 826, and a right display region 830, with a left transition 824 defined between the left and central display regions 822 and 826 and a right transition 828 defined between the central and right display regions 826 and 830.

As may be observed from inspection of FIG. 8, the left and right visual feeds 802 and 804 exhibit brightness distributions that are substantially uniform across the respective widths thereof, and that are substantially equal. However, as may also be observed, the central display region 826 of the visual compilation 820 exhibits a brightness distribution that is approximately double the brightness distributions of the left and right display regions 822 and 826. In addition, discontinuities (in the form of abrupt vertical jumps) in the brightness distribution of the visual compilation 820 may be observed substantially corresponding with the positions of the left and right transitions 824 and 828.

More colloquially, when configured from left and right feeds 802 and 804 of consistent brightness, a 2D/3D/2D arrangement may exhibit twice the brightness in the central (stereo) display region 826 as in the left and right (non-stereo) display regions 822 and 830, with the brightness changing abruptly at the transitions 824 and 828.

As may be understood, substantial differences in brightness distribution and/or abrupt changes in brightness distribution such as those shown in FIG. 8 may be perceived as noticeable artifacts by viewers of the visual compilation 820. Such perceptions may not be certain in all cases, and may not be problematic in all cases. Nevertheless in at least certain instances it may be advantageous for a visual compilation 820 according to the present invention to exhibit sufficient consistency such that visual artifacts are not present, are not perceived if present, are not distracting if perceived, etc.

Consistency may be considered with different standards, and the present invention is not particularly limited with regard to what constitutes "consistency" or "sufficient consistency". As a theoretical ideal, it may desirable to have brightness distribution (or another feed parameter) that is entirely uniform, with no variation. However, in practice degrees of inconsistency in brightness distribution (and other feed parameters) may be acceptable. For example, gradual changes in brightness distribution may not be noticed by a viewer, or may be considered as non-distracting or otherwise acceptable by a viewer. (What is noticeable and/or acceptable may vary based on the particulars of an embodiment and/or the individual abilities and/or tastes of a viewer.) Similarly, even abrupt increases or decreases may not be noticed or may be accepted if those increases or decreases are of sufficiently small magnitude.

However, for purposes of explanation, three types of consistency will be addressed herein. These three types are not necessarily exclusive, and do not necessarily represent all possible types of consistency. Rather, the consistency types described are to be understood as examples, without limiting the present invention. In addition, it is noted that the example consistency types given address consistency in space; for at least certain embodiments of the present invention, consistency over time, and/or with regard to other contexts, also may be considered.

First, uniformity may be considered to be an arrangement wherein a feed parameter (e.g. brightness distribution) does not vary in space, remaining "flat". That is, the feed parameter is "the same everywhere", regardless of position in space. Second, continuity may be considered to be an arrangement wherein a feed parameter may vary in space but without discontinuities or abrupt "jumps" where the feed parameter changes immediately or very rapidly. Third, smoothness may be considered to be an arrangement wherein a feed parameter may vary in space but without sudden changes in direction of variation, or "corners" where the rate of change (if any) changes rapidly. As noted previously, these three types of consistency are not exclusive; a visual compilation with uniform brightness distribution typically may also be both continuous and smooth. Conversely, the brightness distribution of a visual compilation may be smooth without being uniform, continuous without being smooth, etc. The visual compilation 820 in FIG. 8 is by observation not uniform, not continuous, and not smooth.

With regard to consistency, for at least some embodiments the outer boundaries of a visual feeds and/or compilations may be ignored. To refer again to FIG. 8, at the far left of the left display region 822 the brightness distribution drops to zero, and likewise at the far right of the right display region 830. These may be understood to represent the edges of a physical display, the outline of a "window" of visual content being outputted on a larger display, etc. Consistency along the outer boundaries of a visual compilation is not necessarily excluded from the present invention, but is not considered in this description of consistency.

Figure 9:
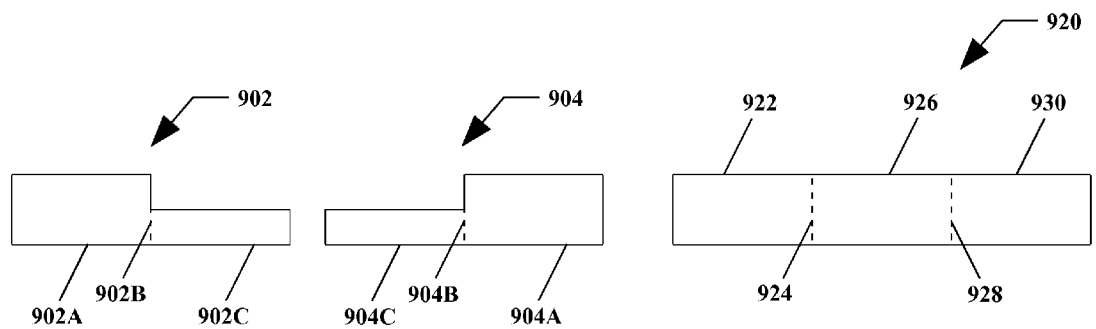
FIG. 9 shows example left and right visual fields with brightness distributions substantially halved in portions thereof, and brightness distributions of display regions associated therewith, according to the present invention.

Now with reference to FIG. 9, therein is presented another example illustration showing a feed parameter across a 2D/3D/2D arrangement according to the present invention. As may be seen, a left feed 902 includes a first portion 902A, a second portion 902C, and a boundary 902B defined therebetween. A right feed 904 similarly includes a first portion 904A, a second portion 904C, and a boundary 904B defined therebetween. As may be observed, the brightness distribution in the second portions 902C and 904C of left and right feeds 902 and 904 is approximately half of the brightness distribution in the first portions 902A and 904A of left and right feeds 902 and 904.

Still with reference to FIG. 9, the visual compilation 920 shows left, central, and right display regions 922, 926, and 930 and transitions 924 and 928 therebetween. As may be observed, the brightness distribution (or other feed parameter) in the central display region 926 is at least substantially similar to the brightness distribution in the left and right display regions 922 and 930. Also, the brightness distribution throughout the visual compilation 920 is at least substantially uniform, continuous, and smooth.

As noted, for at least certain feed parameters, including but not limited to brightness distribution, the central region 926 of the compilation 920 exhibits the feed parameter as the sum of the feed parameters of the second portions 902C and 904C of the left and right feeds 902 and 904. Because, as shown in FIG. 9, brightness distribution in the second portions 902C and 904C of the left and right feeds 902 and 904 is half of the brightness distribution in the first portions 902A and 904A, the brightness distribution in the left, central, and right display regions 922, 926, and 930 of the compilation 920 are all at least approximately equal.

Thus, by scaling the brightness distribution in the second portions 902C and 904C of the left and right feeds 902 and 904 in a substantially a uniform 50% decrease, the brightness distribution in the compilation 920 is substantially uniform. More colloquially, the parts of the left and right feeds that cooperate to deliver stereo imagery are dimmed, so that the total perceived brightness in the stereo display region is consistent with the perceived brightness in the non-stereo display regions.

The arrangement in FIG. 9 is relatively simple, i.e. a uniform 50% downward scaling of the second portions 902C and 904C of the left and right feeds 902 and 904. For certain embodiments of the present invention, such an arrangement may be suitable. However, with reference to FIG. 10 and FIG. 11, it may be understood that such simple approaches as those shown in FIG. 9 may not necessarily be suitable for all embodiments.

Figure 10:
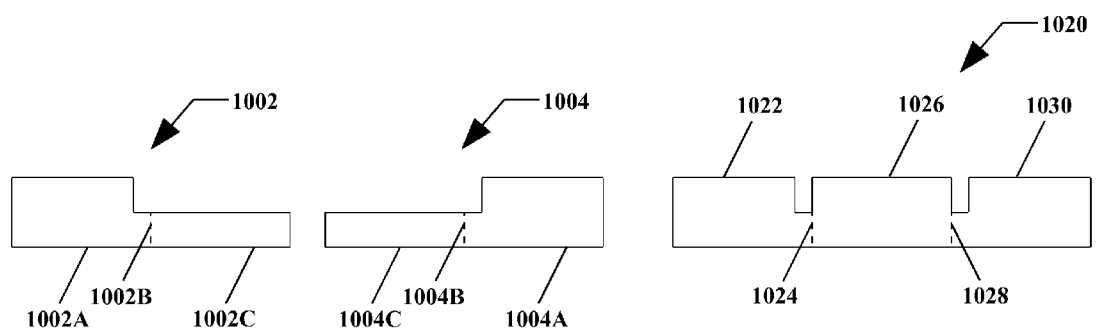
FIG. 10 shows example left and right visual fields with brightness distributions substantially halved in portions thereof misaligned outward, and brightness distributions of display regions associated therewith, according to the present invention.

With regard to FIG. 10, a left feed 1002 includes a first portion 1002A, a second portion 1002C, and a boundary 1002B defined therebetween. A right feed 1004 similarly includes a first portion 1004A, a second portion 1004C, and a boundary 1004B defined therebetween. The brightness distribution in the second portions 1002C and 1004C of left and right feeds 1002 and 1004 is approximately half of the brightness distribution in the first portions 1002A and 1004A of left and right feeds 1002 and 1004.

However, as may be observed the change in brightness distribution in the left and right feeds 1002 and 1004 is not aligned with the left and right boundaries 1002B and 1004B. While the second portions 1002C and 1004C are decreased in brightness distribution by approximately 50%, part of the first portions 1002A and 1004A also are decreased in brightness distribution by approximately 50%.

An effect of this outward misalignment of the brightness distribution scaling may be observed in the visual compilation 1020. Notably, while much of the visual compilation exhibits at least substantially uniform brightness distribution, two "gaps" are present in the left and right display regions 1022 and 1030, substantially adjacent the transitions 1024 and 1028 with the central display region 1026. For at least certain embodiments, such "gaps"—which may for this example represent lower brightness distribution, and thus which may manifest as dark vertical bands—may be perceived by a viewer. Thus while visual artifacts relating to greater brightness distribution in the central display region 1026 may have been avoided, new visual artifacts may have been introduced.

Figure 11:
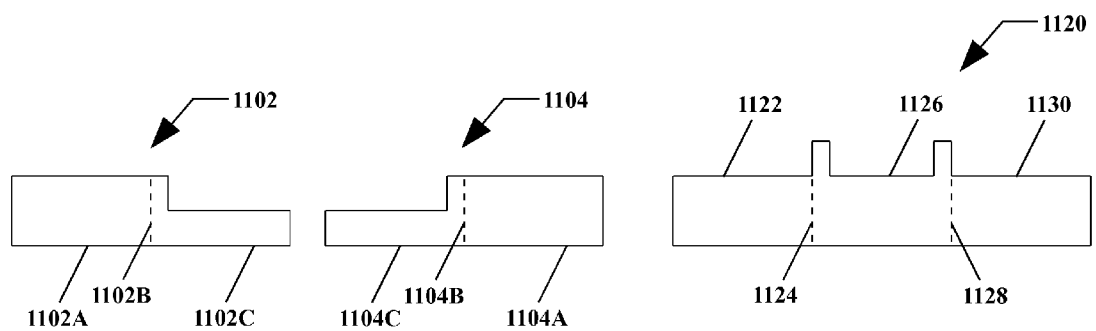
FIG. 11 shows example left and right visual fields with brightness distributions substantially halved in portions thereof misaligned inward, and brightness distributions of display regions associated therewith, according to the present invention.

Similarly, in FIG. 11 a left feed 1102 includes a first portion 1102A, second portion 1102C, and boundary 1102B defined therebetween. A right feed 1104 includes a first portion 1104A, second portion 1104C, and boundary 1104B defined therebetween. The brightness distribution in much of the second portions 1102C and 1104C of left and right feeds 1102 and 1104 is approximately half of the brightness distribution in the first portions 1102A and 1104A of left and right feeds 1102 and 1104.

However, as may be observed the change in brightness distribution in the left and right feeds 1102 and 1104 again is not aligned with the left and right boundaries 1102B and 1104B. Part of the second portions 1102C and 1104C are decreased in brightness distribution by approximately 50%, but part of the second portions 1102C and 1104C are not.

An effect of this outward misalignment of brightness distribution scaling again may be observed in the compilation 1120. While much of the visual compilation exhibits at least substantially uniform brightness distribution, two "spikes" are present in the left and right display regions 1122 and 1130, substantially adjacent transitions 1124 and 1128 with the central display region 1126. As noted with regard to gaps in FIG. 10, for at least certain embodiments spikes such as those in FIG. 11—which may for this example represent higher brightness distribution, and thus which may manifest as bright vertical bands—also may be perceived by a viewer. Again, although visual artifacts relating to greater brightness distribution in the central display region 1126 may have been avoided, other visual artifacts may have been introduced.

Misalignments in scaling as those shown in FIG. 10 and FIG. 11 are presented as examples, but are not necessarily arbitrary in nature. Depending on the manner in which scaling is accomplished for a particular embodiment, the manner in which content is displayed, etc. for a particular embodiment, a variety of factors may produce misalignment of scaling. For example, if scaling is accomplished with a physical filter, a physical misalignment of the filter may result in misalignment of the scaling. Alternately, if images are displayed in imperfect alignment, the extent of a stereo region may vary from what is anticipated, resulting in the appearance of misaligned scaling (regardless of whether it is the scaling itself that is misaligned). Stereo alignment itself depends on numerous factors, ranging from arrangement and function of displays to variations in eye spacing among viewers.

Although FIG. 9, FIG. 10, and FIG. 11 show substantially uniform scaling of feed parameters, the present invention is not limited only to such uniform scaling. Other arrangements may be equally suitable, and/or may offer advantages for at least certain embodiments.

Figure 12:
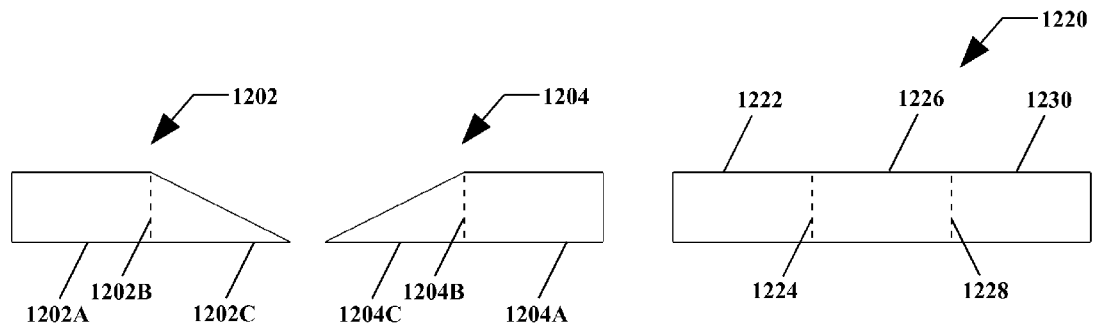
FIG. 12 shows example left and right visual fields with brightness distributions substantially linearly decreasing in portions thereof, and brightness distributions of display regions associated therewith, according to the present invention.

With reference to FIG. 12, therein is shown an example illustration of a feed parameter for a 2D/3D/2D arrangement according to the present invention, with a left feed 1202 with first portion 1202A, second portion 1202C, and boundary 1202B, and a right feed 1204 with first portion 1204A, second portion 1204C, and boundary 1204B.

As may be observed, the brightness distribution in the second portion 1202C of left feed 1202 decreases approximately linearly from the boundary 1202B to opposite edge of the second portion 1202C; although the average brightness distribution in the second portion 1202C is approximately 50% of the brightness distribution in the first portion 1202A, the brightness distribution varies spatially across the second portion 1202C.

Similarly, the brightness distribution in the second portion 1204C of left feed 1204 decreases approximately linearly from the boundary 1204B to opposite edge of the second portion 1204C. Again the second portion 1204C has a brightness distribution that is approximately 50% of the brightness distribution in the first portion 1204A, but the brightness distribution varies spatially across the second portion 1202C.

However, although the brightness distribution in the second portions 1202C and 1204C varies, the brightness distribution in the central display region 1226 of the visual compilation 1220 nevertheless may be observed to be at least substantially uniform, and to be at least substantially equal to the brightness distribution in the left and right display regions 1222 and 1230. As noted previously, the brightness distribution in the central display region 1226 includes the brightness distributions from the second portion 1202C of the left feed 1202 and from the second portion 1204C of the right feed 1204. In the arrangement shown in FIG. 12, where the brightness distribution from the left feed 1202 is high (proximate the left transition 1224), the contribution from the brightness distribution from the right feed 1204 is low; conversely where the brightness distribution from the right feed 1204 is high (proximate the right transition 1228), the contribution from the brightness distribution from the left feed 1202 is low.

An arrangement such as that in FIG. 12 may be advantageous for at least certain embodiments of the present invention. Consider an example wherein left and right feeds 1202 and 1204 represent still images, with the compilation 1220 representing a still image that has the appearance of being three dimensional in the central portion 1226 thereof and two dimension in the left and right portions 1222 and 1230 thereof. At the left transition 1224, the brightness of the still image is provided substantially entirely by the left feed 1202 (corresponding with the boundary 1202B); at the right transition 1228 the brightness of the still image is provided substantially entirely by the right feed 1204 (corresponding with the boundary 1204B).

Because a stereo image results from the combination of left and right image components, with the right feed 1204 contributing substantially nothing at the left transition 1224, and the left feed contributing substantially nothing at the right transition 1228, the compilation 1220 is substantially non-stereo at both the left and right transitions 1224 and 1228. However, moving inward from the left transition 1224 a linearly increasing amount of the image brightness is delivered by the right feed 1204; likewise moving inward from the right transition 1228 a linearly increasing amount of the image brightness is delivered by the left feed. Thus, the stereo property of the still image in the central display region 1226 becomes increasingly pronounced moving inward from the left and right transitions 1224 and 1228. However, the compilation 1220 does not at any point "jump" from being mono to stereo, from two dimensional to three dimensional. The change from two to three dimensional still image is gradual.

In at least some cases, human vision tends to more readily identify variations in images that are sharp, sudden, etc. Thus, a sudden jump from two dimensionality in the left or right display region 1222 or 1230 to three dimensionality in the central display region 1226 may be visible, potentially distracting, etc. to a viewer even if the brightness distribution across the compilation 1220 is substantially uniform, smooth, etc. The gradual linear decrease in brightness distribution in the left and right feeds 1202 and 1204 thus may, for at least certain embodiments, contribute to a compilation 1220 that appears less "artificial", more "real", etc., for example by having less noticeable transitions in dimensionality (in addition to having less noticeable transitions in brightness distribution, etc. as already described).

It is noted that dimensionality may be considered for at least certain embodiments of the present invention to be a feed parameter, with controlling such a feed parameter being a function of the present invention. However, as the notion of dimensionality is at least somewhat abstract (at least compared to brightness), FIG. 12 and the description associated therewith is presented at least in part to illustrate the manner in which the present invention may be utilized to control dimensionality in addition to and/or in place of other feed parameters.

However, the description of potential utility of an arrangement such as shown in FIG. 12 in controlling dimensionality should not be interpreted as excluding other utility for such an arrangement, or for other arrangements.

Figure 13:
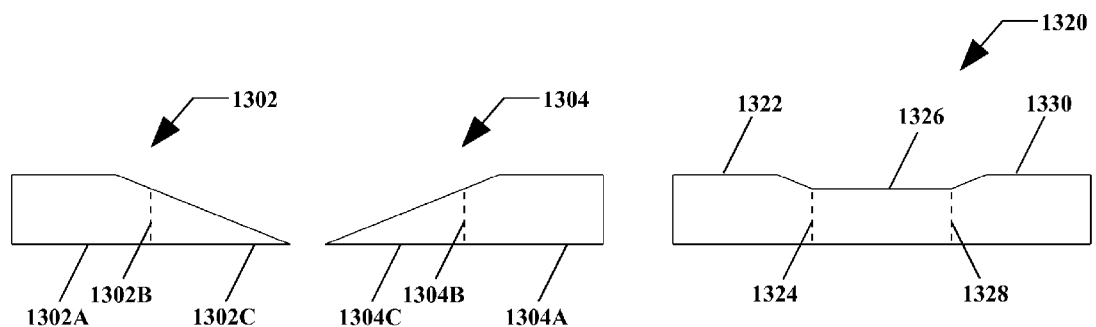
FIG. 13 shows example left and right visual fields with brightness distributions substantially linearly decreasing in portions thereof and misaligned outward, and brightness distributions of display regions associated therewith, according to the present invention.

Turning now to FIG. 13, a left feed 1302 includes a first portion 1302A, a second portion 1302C, and a boundary 1302B defined therebetween. A right feed 1304 similarly includes a first portion 1304A, a second portion 1304C, and a boundary 1304B defined therebetween. The brightness distribution in the second portions 1302C and 1304C of left and right feeds 1302 and 1304 decreases substantially linearly from the brightness distribution in the first portions 1302A and 1304A of left and right feeds 1302 and 1304.

However, as may be observed the change in brightness distribution in the left and right feeds 1302 and 1304 is not aligned with the left and right boundaries 1302B and 1304B. While the second portions 1302C and 1304C exhibit a substantially linear decrease in brightness distribution, that decrease is not confined only to the second portions 1302C and 1304C. Rather, the linear decreases begin outward of the boundaries 1302B and 1304B respectively.

As noted with regard to FIG. 10 and FIG. 11, such misalignment may result from a variety of causes. However for an arrangement such as that shown in FIG. 13 (and a converse arrangement shown in FIG. 14) the results with regard to the visual compilation 1320 may be different than in FIG. 10 and/or FIG. 11.

As may be seen, the visual compilation 1320 exhibits a substantially linear decrease in brightness distribution in the first and second display regions 1322 and 1330 moving inward toward the central display region 1326. At the left and right transitions 1324 and 1328 respectively, the brightness distribution substantially levels off, so that the brightness distribution within the central display region 1326 is substantially uniform, although the brightness distribution for the compilation 1320 overall is not.

Where misalignment in FIG. 10 produces discontinuities in the brightness distribution of the compilation, misalignment in FIG. 13 does not produce similar discontinuities. The brightness distribution of the compilation 1320 is not uniform or smooth, but is continuous.

Figure 14:
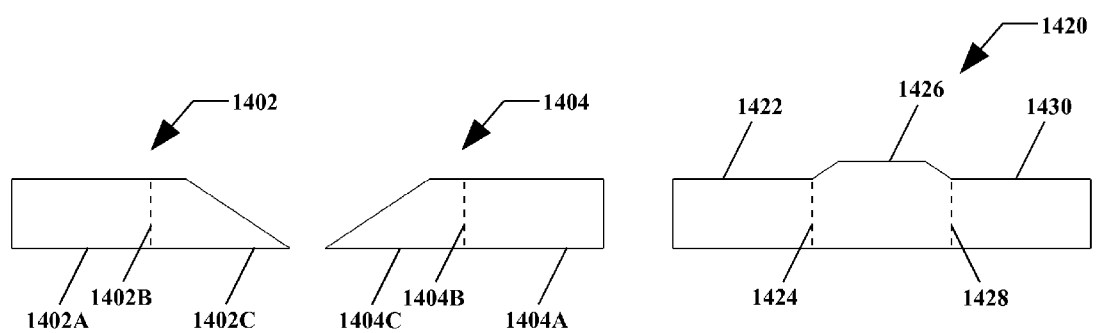
FIG. 14 shows example left and right visual fields with brightness distributions substantially linearly decreasing in portions thereof and misaligned inward, and brightness distributions of display regions associated therewith, according to the present invention.

Turning to FIG. 14, a left feed 1402 includes a first portion 1402A, a second portion 1402C, and a boundary 1402B defined therebetween. A right feed 1404 similarly includes a first portion 1404A, a second portion 1404C, and a boundary 1404B defined therebetween. The brightness distribution in the second portions 1402C and 1404C of left and right feeds 1402 and 1404 decreases substantially linearly from the brightness distribution in the first portions 1402A and 1404A of left and right feeds 1402 and 1404.

As may be observed the change in brightness distribution in the left and right feeds 1302 and 1304 is not aligned with the left and right boundaries 1302B and 1304B, beginning inward of the boundaries 1402B and 1404B respectively.

The visual compilation 1420 exhibits a substantially linear increase in brightness distribution in the central display region 1426, beginning at the left and right transitions 1424 and 1428 respectively. At some distance inward from the left and right transitions 1424 and 1428, the brightness distribution substantially levels off to be substantially uniform across part of the central display region 1426.

Again, where misalignment in FIG. 11 produces discontinuities in the brightness distribution of the compilation, misalignment in FIG. 14 does not produce similar discontinuities. The brightness distribution of the compilation 1420 is not uniform or smooth, but is continuous.

As noted, human vision may key from and/or may more readily detect different features under different conditions. While misalignment in FIG. 13 and FIG. 14 produces non-uniform and non-smooth brightness distribution in the compilations thereof, the brightness distributions are nonetheless continuous. Thus for at least certain embodiments, e.g. wherein discontinuity is of particular concern, it may be advantageous to use a substantially linear decrease in brightness distribution as in FIG. 12, FIG. 13, and FIG. 14, for example if misalignment of the sorts shown in FIG. 13 and FIG. 14 is anticipated as probable, understood to be possible whether probable or not, etc.

Figure 15:
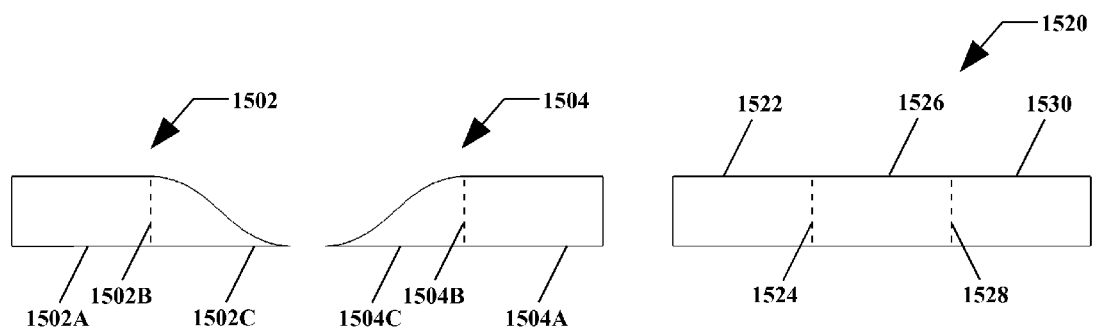
FIG. 15 shows example left and right visual fields with brightness distributions substantially decreasing at an increasing rate then at a decreasing rate, and brightness distributions of display regions associated therewith, according to the present invention.

Now with reference to FIG. 15, an example is shown therein of a feed parameter such as brightness distribution for a 2D/3D/2D arrangement according to the present invention, with a left feed 1502 with first portion 1502A, second portion 1502C, and boundary 1502B, and a right feed 1504 with first portion 1504A, second portion 1504C, and boundary 1504B.

As may be observed, the brightness distribution in the second portion 1502C of the left feed 1502 decreases. More particularly, the brightness distribution in the second portion 1502C decreases at an increasing rate beginning at the boundary 1502B, and then at some distance from the boundary 1502B "turns over" to decrease at a decreasing rate. The average brightness distribution in the second portion 1502C is approximately 50% of the brightness distribution in the first portion 1502A, though the brightness distribution varies spatially across the second portion 1502C.

Similarly, the brightness distribution in the second portion 1504C of the right feed 1504 decreases at an increasing rate beginning at the boundary 1502B, and then at some distance from the boundary 1502B "turns over" to decrease at a decreasing rate. The average brightness distribution in the second portion 1502C is approximately 50% of the brightness distribution in the first portion 1502A, though the brightness distribution varies spatially across the second portion 1502C. However, although the brightness distribution in the second portions 1502C and 1504C varies throughout, the brightness distribution in the central display region 1526 of the visual compilation 1520 nevertheless may be observed to be at least substantially uniform, and to be at least substantially equal to the brightness distribution in the left and right display regions 1522 and 1530. As may be observed, the brightness distributions in the second portions 1502C and 1504C of the left and right feeds 1502 and 1504 may be seen to be at least substantially mirror-images, when considered geometrically as illustrated. That is, rates of change in one feed are balanced by rates of change in the other feed, so as to produce a substantially uniform brightness distribution in the central display region 1526 and in the compilation 1520 as a whole (at least in the example of FIG. 15).

At least certain comments made with regard to FIG. 12, such as a gradual shift from two dimensionality to three dimensionality, may be understood as applying likewise with regard to FIG. 15 (and similarly to at least certain other examples presented herein). In FIG. 15, the brightness distributions initially decrease gradually at the boundaries 1502B and 1504B, and also decrease gradually at the inner edges of the left and right feeds 1502 and 1504, though the rate of decrease is higher elsewhere in the second portions 1502C and 1504C.

Figure 16:
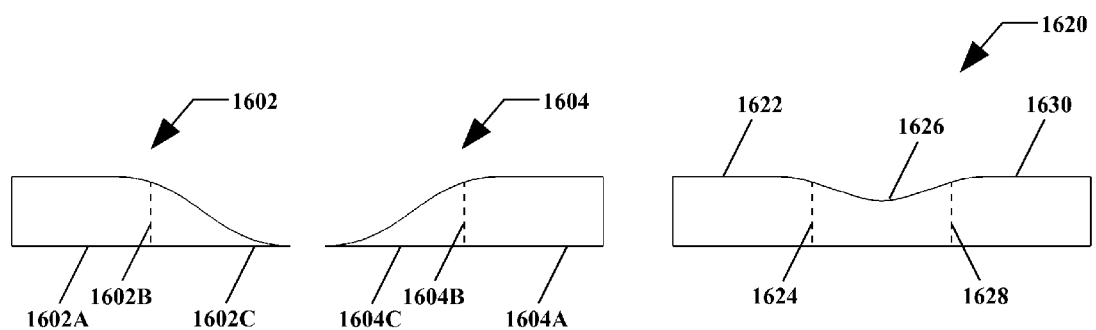
FIG. 16 shows example left and right visual fields with brightness distributions substantially at an increasing rate then at a decreasing rate and misaligned outward, and brightness distributions of display regions associated therewith, according to the present invention.

Now with reference to FIG. 16, a left feed 1602 includes a first portion 1602A, a second portion 1602C, and a boundary 1602B defined therebetween. A right feed 1604 similarly includes a first portion 1604A, a second portion 1604C, and a boundary 1604B defined therebetween. The brightness distributions in the second portions 1602C and 1604C of left and right feeds 1602 and 1604 decrease from the brightness distributions in the first portions 1602A and 1604A of left and right feeds 1602 and 1604 substantially at an increasing rate, and then at some point "turn over" to decrease at a decreasing rate.

However, as may be observed the change in brightness distribution in the left and right feeds 1602 and 1604 is not aligned with the left and right boundaries 1602B and 1604B. The decrease in brightness distribution is not confined only to the second portions 1602C and 1604C. Rather, the decreases begin outward of the boundaries 1602B and 1604B respectively.

As noted previously with regard to FIG. 10 and FIG. 11, and FIGS. 13 and 14, such misalignment may result from a variety of causes. However for an arrangement such as that shown in FIG. 16 (and a converse arrangement shown in FIG. 17) the results with regard to the visual compilation 1620 may be different than in previous example figures herein. As may be seen, the visual compilation 1620 exhibits a gradual non-linear decrease in brightness distribution in the left and right display regions 1622 and 1630 moving inward toward the left and right transitions 1624 and 1628 and into the central display region 1626.

Where outward misalignment in FIG. 10 results in a brightness distribution for the compilation that is neither smooth nor continuous, and misalignment in FIG. 13 results in a brightness distribution for the compilation that is continuous but not smooth, the brightness distribution of the compilation 1620 in FIG. 16 is continuous and smooth, though not uniform.

Figure 17:
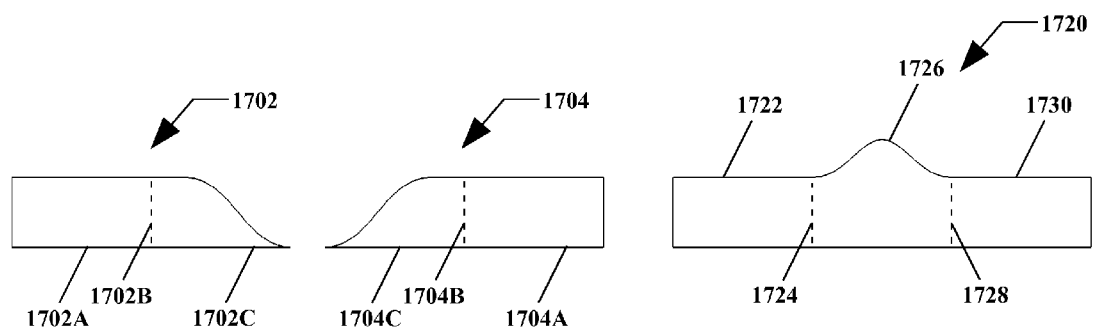
FIG. 17 shows example left and right visual fields with brightness distributions substantially at an increasing rate then at a decreasing rate and misaligned inward, and brightness distributions of display regions associated therewith, according to the present invention.

Turning to FIG. 17, a left feed 1702 includes a first portion 1702A, a second portion 1702C, and a boundary 1702B defined therebetween. A right feed 1704 similarly includes a first portion 1704A, a second portion 1704C, and a boundary 1704B defined therebetween. The brightness distribution in the second portions 1702C and 1704C of left and right feeds 1702 and 1704 decrease from the brightness distributions in the first portions 1702A and 1704A of left and right feeds 1702 and 1704 substantially at an increasing rate, and then at some point "turn over" to decrease at a decreasing rate.

As may be observed the change in brightness distribution in the left and right feeds 1702 and 1704 is not aligned with the left and right boundaries 1702B and 1704B, beginning inward of the boundaries 1702B and 1704B respectively. The visual compilation 1720 exhibits a gradual non-linear increase in brightness distribution in the central display region 1726, beginning approximately at the left and right transitions 1724 and 1728.

Again, where inward misalignment in FIG. 11 results in a brightness distribution for the compilation that is neither smooth nor continuous, and misalignment in FIG. 14 results in a brightness distribution for the compilation that is continuous but not smooth, the brightness distribution of the compilation 1720 in FIG. 17 is continuous and smooth, though not uniform.

As already noted, human vision may key from and/or may more readily detect different features under different conditions. For at least certain embodiments, e.g. wherein discontinuity and/or lack of smoothness are of particular concern, it may be advantageous to use a change in brightness distribution as in FIG. 15, FIG. 16, and FIG. 17, for example if misalignment of the sorts shown in FIG. 16 and FIG. 16 is anticipated as probable, understood to be possible whether probable or not, etc.

The present invention is not particularly limited with regard to the particular form of changing brightness distribution (or other feed parameters). As shown in FIG. 15 through FIG. 17 the curves indicating brightness distribution against position at least substantially resemble ellipse sections. However, this is an example only. A wide variety of changes in brightness distribution may be suitable for use with the present invention, depending on the particulars of a given embodiment.

For certain embodiments, substantially quadratic functions, e.g. relating to the square of distance from some position (typically though not necessarily the boundary between first and second portions of a feed) may be suitable. Likewise, other exponential functions, including but not limited to cubic functions, may be suitable. Brightness distribution changes may be simple or complex, smooth or not, continuous or not, etc. Areas with no decrease, or even with increase, in brightness distribution may be suitable for certain embodiments.

Other arrangements also may be equally suitable.

Figure 18:
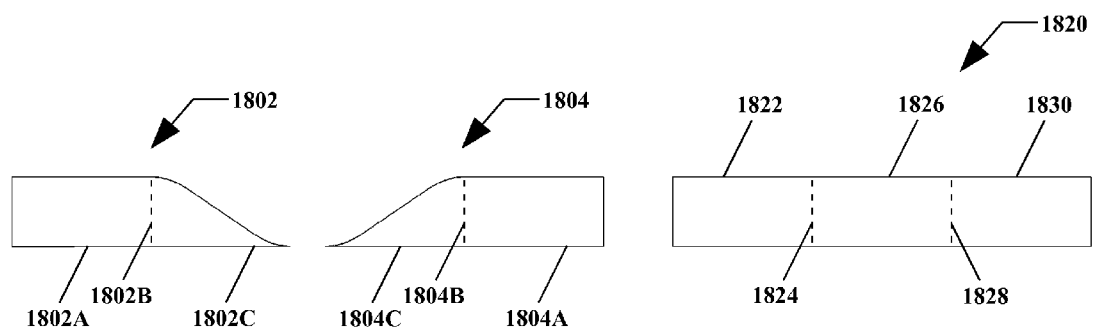
FIG. 18 shows example left and right visual fields with brightness distributions substantially decreasing at an increasing rate, then at a linear rate, then at a decreasing rate, and brightness distributions of display regions associated therewith, according to the present invention.

For example, with reference to FIG. 18, therein is shown a left feed 1802 with first portion 1802A, second portion 1802C, and boundary 1802B, and a right feed 1804 with first portion 1804A, second portion 1804C, and boundary 1804B. As may be observed, the brightness distribution in the second portion 1802C of the left feed 1802 decreases substantially at an increasing rate, then at a linear rate, then at a decreasing rate. Similarly, the brightness distribution in the second portion 1804C of the right feed 1804 decreases at an increasing, then at a linear rate, then at a decreasing rate.

FIG. 18 also shows a brightness distribution in for a visual compilation 1820 having left and right display regions 1822 and 1830 and a central display region 1826, with left and right transitions 1824 and 1828 therebetween. As may again be observed, the brightness distribution in the compilation 1820 is at least substantially uniform, and the brightness distribution in the central display region 1826 is at least substantially equal to the brightness distribution in the left and right display regions 1822 and 1830.

Turning to FIG. 19, another example is provided with a left feed 1902 with first portion 1902A, second portion 1902C, and boundary 1902B, and a right feed 1904 with first portion 1904A, second portion 1904C, and boundary 1904B. As may be observed, the brightness distribution in the second portion 1902C of the left feed 1902 decreases substantially at an increasing rate, then at a decreasing rate, then again at an increasing rate, and again at a decreasing rate. Similarly, the brightness distribution in the second portion 1904C of the right feed 1904 decreases at an increasing, then a decreasing, then an increasing, and then again a decreasing rate.

FIG. 19 also shows a brightness distribution in for a visual compilation 1920 having left and right display regions 1922 and 1930 and a central display region 1926, with left and right transitions 1924 and 1928 therebetween. As may again be observed, the brightness distribution in the compilation 1920 is at least substantially uniform, and the brightness distribution in the central display region 1926 is at least substantially equal to the brightness distribution in the left and right display regions 1922 and 1930.

In another example, in FIG. 20 is shown a left feed 2002 with first portion 2002A, second portion 2002C, and boundary 2002B, and a right feed 2004 with first portion 2004A, second portion 2004C, and boundary 2004B. As may be observed, the brightness distribution in the second portion 2002C of the left feed 2002 decreases substantially at an increasing rate, then at a decreasing rate, then remains level, then decreases at an increasing rate again, and then again at a decreasing rate. Similarly, the brightness distribution in the second portion 2004C of the right feed 2004 decreases substantially at an increasing rate, then at a decreasing rate, then remains level, then decreases at an increasing rate again, and then again at a decreasing rate.

FIG. 20 also shows a brightness distribution in for a visual compilation 2020 having left and right display regions 2022 and 2030 and a central display region 2026, with left and right transitions 2024 and 2028 therebetween. As may again be observed, the brightness distribution in the compilation 2020 is at least substantially uniform, and the brightness distribution in the central display region 2026 is at least substantially equal to the brightness distribution in the left and right display regions 2022 and 2030.

As shown and described, many approaches with regard to brightness distribution and/or other feed parameters may be utilized in accordance with the present invention, so as to produce a substantially uniform brightness distribution (or other feed parameter). The preceding examples should not be taken as limiting, and arrangements may be different than, simpler than, and/or more complex than those shown and described.

In addition, although many examples previously herein have produced a uniform brightness distribution in a visual compilation, or referred to non-uniform brightness distributions as being erroneous, due to misalignment, incident, to be avoided, etc., the present invention is not limited only to arrangements that produce, or that approach, a uniform brightness distribution or other feed parameter. In certain embodiments, deliberate variation in a feed parameter may be advantageous.

Now with respect to FIG. 21, therein is shown a left feed 2102 with first portion 2102A, second portion 2102C, and boundary 2102B, and a right feed 2104 with first portion 2104A, second portion 2104C, and boundary 2104B. As may be observed, the brightness distribution in the second portion 2102C of the left feed 2102 decreases substantially at an increasing rate proximate the boundary 2102B, then at a linear rate. Similarly the brightness distribution in the second portion 2104C of the right feed 2104 decreases substantially at an increasing rate proximate the boundary 2104B, then at a linear rate.

FIG. 21 also shows a brightness distribution in for a visual compilation 2120 having left and right display regions 2122 and 2130 and a central display region 2126, with left and right transitions 2124 and 2128 therebetween. As may observed, the brightness distribution in the compilation 2120 is substantially continuous, but is not substantially uniform or substantially smooth, with the brightness distribution in the central region 2126 exhibiting an increase moving inward from both the left and right transitions 2124 and 2128.

Although as previously noted, for at least some embodiments it may be undesirable to have discontinuities, etc. in brightness distribution, in other embodiments having for example an increased brightness distribution in certain parts of the compilation 2120 may be advantageous. For example, as has been noted the central display region 2126 may be substantially stereo, while the left and right display regions 2122 and 2130 may be substantially stereo; such an arrangement may in at least certain embodiments contribute to a perception that the entire compilation 2120 is stereo (or otherwise three dimensional in appearance), without necessarily providing stereo imagery for the entire compilation 2120. The viewer may (perhaps unconsciously) note that the central display region 2126 may appear three dimensional, and consider the entirety of the compilation 2120 to be similarly three dimensional (again perhaps unconsciously), even when parts of the compilation 2120 (notably the left and right display regions 2122 and 2130) are only two dimensional.

In certain embodiments, it may be useful to emphasize and/or draw attention to the central display region 2126 for example to highlight three dimensionality in the central display region 2126 (and/or draw attention to features in the central display region, such as image content, or to features in the left and/or right display regions, etc.) With greater brightness distribution, the central display region 2126 and/or portions thereof may appear brighter to a viewer than left and/or right display regions 2122 and 2130. Highlighting of part of the compilation 2120 that is three dimensional may for example encourage a perception that the entire compilation is three dimensional (even if parts are only two dimensional).

However, in at least some such embodiments, even when it may be advantageous to so highlight the central display region 2126 (and/or some other portion of the compilation), it also may be useful to in some fashion control the degree and/or form of highlighting. That is, it may be advantageous for highlighting to include a greater brightness distribution, but not so much greater as to be clearly noticeable to a viewer. It may be advantageous for highlighting to include a greater brightness distribution, but to remain continuous (as in FIG. 21), to exhibit a gradual increase, etc. In addition, features other than shown in FIG. 21, such as an increase in brightness distribution that is also smooth, likewise may be advantageous in certain embodiments, and may be achieved for example through other brightness distribution profiles for left and right feeds 2102 and 2104 (e.g. by decreasing the rate of decrease at the right edge of the right feed 2102 and the left edge of the right feed 2104 so as to smooth the increase in brightness distributions at the left and right transitions 2124 and 2128 in the compilation 2120).

Alternatively, again through suitable choice of brightness profile of left and right feeds 2102 and 2104, positions at which the brightness profile of the compilation 2120 increases (or decreases, etc.) may be controlled. For example, through suitable selection of brightness profile in the left and right feeds 2102 and 2104, the increase in brightness profile in the compilation 2120 may be made to begin either inward or outward of the left and right transitions 2124 and 2128, such that changes in brightness profile in the compilation 2120 do not coincide spatially with changes from non-stereo to stereo at left and right transitions 2124 and 2128.

A wide variety of brightness distribution profiles may be possible within the scope of the present invention, and likewise a wide variety of profiles of other feed parameters. The present invention is not limited only to the profiles shown and described herein.

Figure 22:
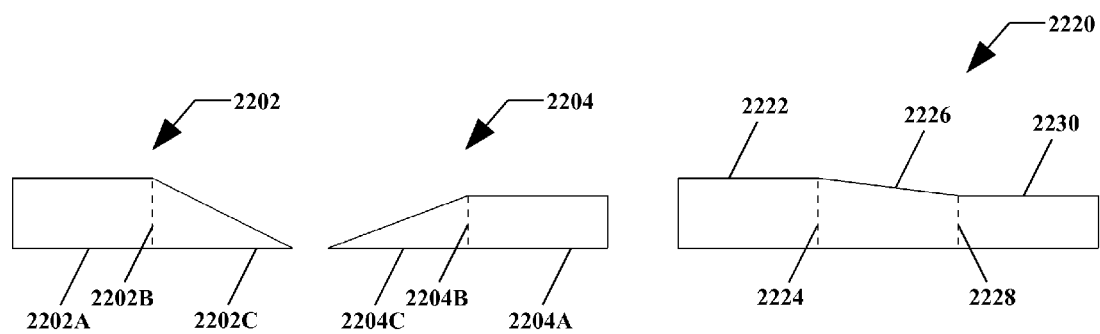
FIG. 22 shows example left and right visual fields with unequal brightness distributions substantially linearly decreasing in portions thereof, and brightness distributions of display regions associated therewith, according to the present invention.

An additional notable example of a non-uniform brightness profile for a compilation as may be advantageous in certain embodiments is shown in FIG. 22. Therein is shown a left feed 2202 with first portion 2202A, second portion 2202C, and boundary 2202B, and a right feed 2204 with first portion 2204A, second portion 2204C, and boundary 2204B.

As may be observed, brightness distribution in the second portion 2202C of the left feed 2102 decreases substantially at a linear rate. Similarly the brightness distribution in the second portion 2204C of the right feed 2204 decreases substantially at a linear rate. However, it is pointed out that where in certain other examples presented herein the left and right feeds have exhibited substantially equal brightness intensity in at least some of the first portions thereof, in the example FIG. 22 the brightness distribution in the first portion 2204A of the right feed 2204 is visibly less than the brightness distribution in the first portion 2202A of the left feed 2202.

FIG. 22 also shows a brightness distribution in for a visual compilation 2220 having left and right display regions 2222 and 2230 and a central display region 2226, with left and right transitions 2224 and 2228 therebetween. As may be observed, the brightness distribution in the right display region 2230 is visibly less than the brightness distribution in the left display region 2222. As also may be observed, the brightness distribution in the central display region 2226 decreases substantially linearly from the brightness distribution of the left display region 2222 to the brightness distribution of the right display region 2230. The brightness distribution in the central display region 2226 might be considered to "bridge" different brightness distributions in left and right display regions 2222 and 2230.

An arrangement such as that shown in FIG. 22 may be advantageous for certain embodiments of the present invention. For example, if for some reason the left and right feeds 2202 and 2204 are not equal in brightness distribution, controlling the brightness distribution of the left and right feeds 2202 and 2204 in the second portions 2202C and 2204C thereof may produce a brightness distribution that is continuous, as in FIG. 22. Other arrangements not shown likewise may be used to produce a brightness distribution that is smooth, etc.

Differences in brightness distribution between left and right feeds 2202 and 2204 may result from a variety of causes. Certain such causes might be signal-related, for example if for some reason one of the left and right feeds 2202 and 2204 undergoes some transformation that results in decreased brightness distribution (e.g. due to transmission errors, etc.). Other causes may be hardware-related, for example considering an arrangement wherein left and right displays are used in an apparatus according to the present invention, with the left feed 2202 outputted to the left display and the right feed 2204 outputted to the right display. If there is some degree of variance in the capability of the displays to deliver brightness distribution—i.e. if one display is brighter than the other—then even if the signals sent to both display call for equal brightness distribution, in practice the output of the displays may not exhibit equal brightness distribution. (Under such circumstances, it may be questioned as a matter of terminology whether a "feed" proper is decreased in brightness distribution. However, the visual output generated by that feed may nevertheless be reduced in brightness distribution, or "dimmer", and that reduction in brightness distribution nevertheless may be addressed at least in part through suitable profiles of brightness distribution in the left and/or right feeds.)

Figure 23:
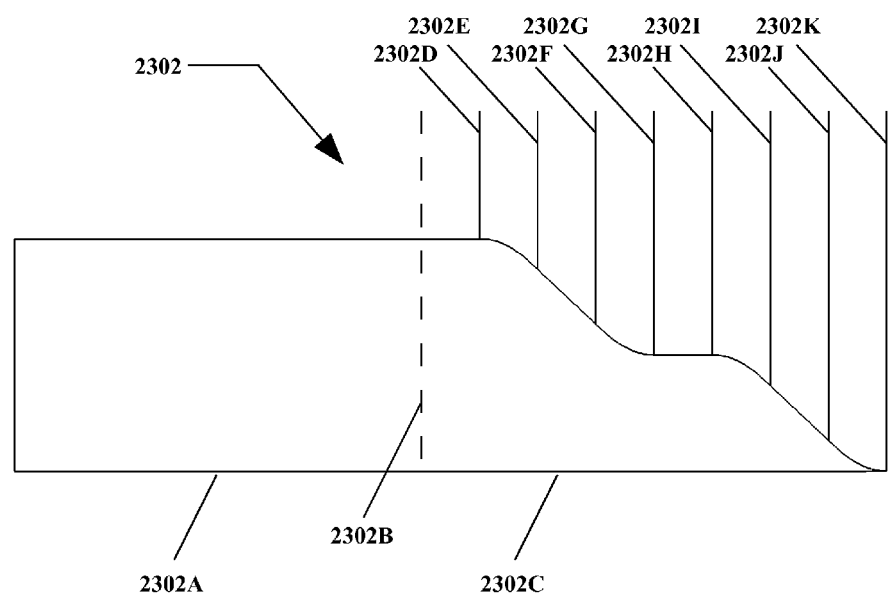
FIG. 23 shows an enlarged view of a left visual field with brightness distribution therein at various distances relative to the boundary between first and second portions, according to the present invention.

Now with regard to FIG. 23, as noted previously a brightness distribution (or other feed parameter) may vary with considerable complexity. FIG. 23 shows an example arrangement of variation in brightness distribution in space across a left feed 2302. The arrangement shown is presented so as to illustrate certain possible arrangements of and variations in brightness distribution, but the present invention is not limited only to arrangements and variations fitting with FIG. 23. In addition, the arrangement in FIG. 23 may apply similarly to at least certain feed parameters other than brightness distribution.

In FIG. 23, a left feed 2302 is shown. Typically though not necessarily a corresponding right feed also may be present, though not illustrated herein. The left feed 2302 includes a first portion 2302A, a boundary 2302B, and a second portion 2302C.

As may be seen, brightness distribution in the left feed 2302 remains substantially uniform from the left edge (not numbered) to a first distance 2302D beyond the boundary 2302B; the first distance 2302D (and likewise other distances referenced herein) may also be considered as extending from the left edge of the display, or from some other "landmark".

Still with reference to FIG. 23, from the first distance 2302D to a second distance 2302E the brightness distribution substantially decreases at an increasing rate. From the second distance 2302E to a third distance 2302F the brightness distribution substantially decreases linearly. From the third distance 2302F to a fourth distance 2302G the brightness distribution substantially decreases at a decreasing rate. From the fourth distance 2302G to a fifth distance 2302H, the brightness distribution remains substantially uniform. From the fifth distance 2302H to a sixth distance 2302I, the brightness distribution again substantially decreases at a decreasing rate. From the sixth distance 2302I to a seventh distance 2302J the brightness distribution substantially decreases linearly. From the seventh distance 2302J to an eighth distance 2302K the brightness distribution substantially decreases at a decreasing rate.

Thus as may be seen, the profile of brightness distribution in the left feed 2302 as shown in FIG. 23 includes segments of no change, segments of constant change (linear change), and segments of non-constant change (i.e. decreasing at increasing or decreasing rates). Though not shown, brightness distributions also may include segments of increase, whether constant or non-constant, etc.

Figure 24:
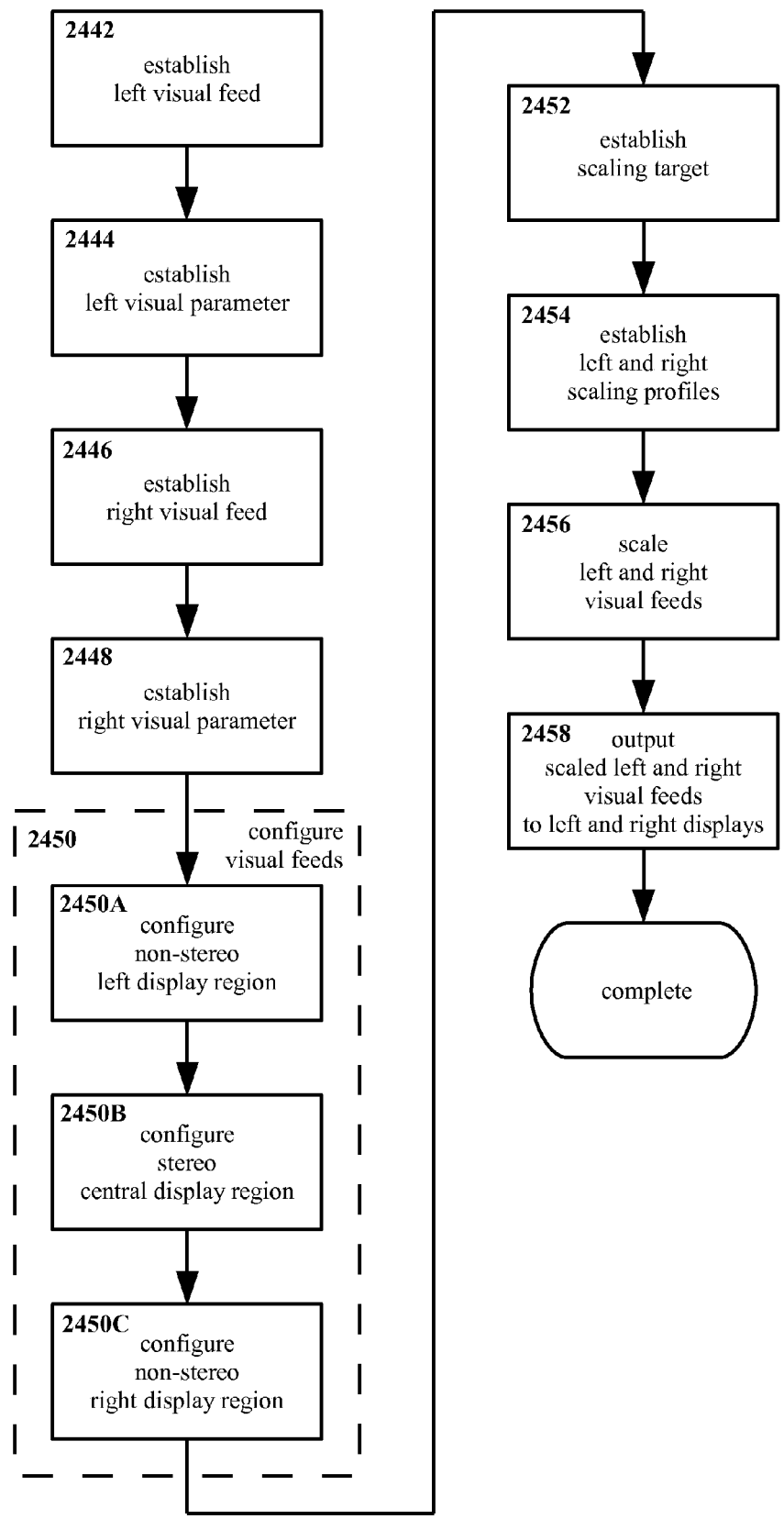
FIG. 24 shows an example method for delivering and controlling multiple feed data according to the present invention, considering left and right visual feeds with a stereo/non-stereo/stereo configuration, in flow chart form.

Turning now to FIG. 24, therein is shown an example embodiment of a method for delivering and controlling multiple-feed data according to the present invention, in flow chart form. In the example of FIG. 24, it is assumed for purposes of illustration that left and right visual feeds are utilized, producing a 2D/3D/2D (non-stereo/stereo/non-stereo) configuration, though the present invention is not limited only to such arrangements.

In the method of FIG. 24, a left visual feed is established 2442. As previously noted, a left visual feed may for example include still imagery, animated imagery, etc. Example visual content may include, but is not limited to, graphics and text.

With regard to establishing the left visual feed, the term "establishing" should be understood broadly as used herein. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a visual feed may encompass several potential approaches, including but not limited to the following.

Establishing a visual feed may include constructing the visual feed, e.g. as a rendering from some mathematical model, as output from some computational process, etc., for example (but not exclusively) through the execution of instructions instantiated on a processor. Establishing a visual feed also may include reading or otherwise obtaining the feed from some system or component internal to a device, such as by reading the visual feed from a data store. Establishing a visual feed additionally may include receiving the feed from some source external to a device or system, such as by streaming or downloading the feed from a wired link, wifi connection, etc.

The present invention is not particularly limited insofar as how feeds may be established. It is required only that feeds that are functional in terms of the present invention are in some fashion made manifest. Other arrangements than those described may be equally suitable. Also, where used with regard to other steps such as establishing feed parameters, scaling targets, etc., establishing should be similarly be interpreted in a broad fashion.

Continuing in FIG. 24, a left visual parameter is established 2444. As described in examples previously herein, visual parameters may include but are not limited to brightness distributions, i.e. "how bright the image is". Typically though not necessarily, information regarding the actual brightness of an image may be incorporated into a visual feed. However, identifying which parameter is to be controlled according to the present invention may nevertheless be a separate step as identified by 2444. That is, image brightness may be part of an image, but selecting image brightness as a parameter to be controlled may be incorporated as part of step 2444 even if the brightness data itself is already present in the image. Thus, establishing the left visual parameter 2444 may be (but is not required to be) a selection or identification process, rather than necessary a data creation or acquisition process.

Regardless, the method continues with establishing 2446 a right visual feed. Right visual feeds have already been described herein, and the comments made with regard to establishing 2442 the left visual feed apply similarly to establishing 2446 the right visual feed.

A right visual parameter is also established 2448. Typically though not necessarily, the right visual parameter corresponds to the left visual parameter as established in step 2444. That is, if the left visual parameter is a brightness distribution of the left feed, then the right visual parameter may be a brightness distribution of the right feed.

Thus, through step 2448 in FIG. 24, the method may be considered in colloquial terms to include (but not be limited to) acquiring in some fashion left and right image data, and specifying what property (e.g. brightness) is to be controlled according to the present invention.

Moving on in FIG. 24, the left and right visual feeds are configured 2450. As noted previously herein, the left and right visual feeds may be configured so as to produce a visual compilation having a non-stereo left display region, a stereo central display region, and a non-stereo right display region. For at least certain embodiments, configuring the left and right visual feeds 2450 may be seen as a single step, relating to arranging the two feeds (or at least determining a suitable arrangement of the feeds) so as to produce the desired non-stereo and stereo display regions from the combination thereof. However, as configuring the visual feeds to produce non-stereo left, stereo central, and non-stereo right display regions may be considered to be of some significance, and the steps may in certain embodiments be at least partially distinct, those steps are identified individually in FIG. 24: a non-stereo left display region is configured 2450A, a stereo central display region is configured 2450B, and a non-stereo right display region is configured 2450C, from the left and right feeds.

The present invention is not particularly limited with regard to how the visual feeds 2450 may be configured. Typically though not necessarily, configuration (e.g. aligning the left and right feeds to produce the indicated non-stereo and stereo display regions) may be carried out using executable instructions instantiated on a processor. This may include, for example, geometric calculations based on the relative size, spacing, position etc. of displays for outputting the left and right feeds, the anticipated position and/or other features of a viewer with regard to viewing the left and right feeds as outputted, etc.

Such an arrangement may be advantageous for at least certain embodiments, for example enabling active adjustment of the configuration 2450 of the left and right visual feeds. The configuration may for example be updated dynamically in response to a variety of factors, including but not limited to changes in content of the left and right feeds, different users making use of a single output device, etc. However, configuring visual feeds 2450 also may be executed in other manners, for example purely in hardware, e.g. by configuring displays, optics, etc. for a mechanical device without necessarily utilizing a processor to determine or control configuration 2450 of the left and right feeds. For example, an apparatus according to the present invention might be fixed in terms of hardware, delivering left and right feeds in a configuration defined by that hardware (and thus set at some point e.g. during fabrication of the apparatus).

Moving on in FIG. 24, a scaling target is established 2452. A scaling target may be understood as the goal of the scaling of left and right feeds, e.g. to produce a uniform brightness distribution across a visual compilation, to produce a smooth or continuous brightness distribution across a visual compilation, to bridge a difference in brightness distribution between left and right feeds that themselves exhibit a difference in brightness distribution, etc. Examples regarding such goals have been illustrated and described previously herein, for example in FIG. 8 through FIG. 22.

Again, the present invention is not particularly limited with regard to how a scaling target is established 2452. In certain embodiments, establishing 2452 a scaling target may be partially or entirely carried out through executing instructions instantiated on a processor. For example, a processor may determine an optimum scaling target for particular visual content, for a particular activity (e.g. an activity relating to visual content, such as operating a computer application), for an individual viewer, for a viewing environment, for a given apparatus, etc.

However, scaling targets also may be established 2452 in whole or in part by a viewer, for example by a viewer indicating viewing preferences for content, etc. In addition, a scaling target may be established partially or entirely in hardware, e.g. an apparatus may be constructed to as to exclusively aim to generate uniform brightness in a visual compilation. Other arrangements also may be equally suitable.

Still with reference to FIG. 24, scaling profiles are established 2454 for the left and right feeds. Where the scaling target is the desired goal for the brightness distribution (or other parameter), the scaling profiles represent the degree to which the left and right feeds are to be scaled in order to reach that target brightness distribution.

The present invention is not particularly limited with regard to how the scaling profiles may be determined 2454. Scaling profiles may be computed using executable instructions instantiated on a processor based on the particulars of the scaling target, for example, but also may be incorporated in a fixed hardware arrangement for an apparatus, read from a data store, or some other suitable arrangement.

Profiles may not necessarily be established "in a vacuum", but rather in response to the desired scaling target. Thus typically though not necessarily, scaling profiles may be determined 2454 computationally. That is, for a given scaling target (as established in step 2452), suitable left and right scaling profiles for achieving that scaling target may be determined for example through the execution of instructions instantiated on a processor. However, such determination need not necessarily be performed in real time; for example scaling profiles for one or more scaling targets that are probable, desirable, etc. might be calculated in advance (potentially far in advance, possibly before an apparatus adapted to carry out the method as shown in FIG. 24 is even built) and stored as data in a data store, to be established 2454 subsequently by being read from that data store.

Such earlier computation and storage may be considered to be part of the step of establishing 2454 the scaling profiles, even if the computation and/or storage take place "out of sequence" compared to the steps in FIG. 24. Similarly, it should be understood that the present invention is not necessarily limited to performing all steps in FIG. 24 (or elsewhere herein) in sequential order unless otherwise specified. Certain embodiments may establish a right visual feed before a left visual feed, establish a scaling target before establishing visual feeds, etc.

Continuing in FIG. 24, the left and right visual feeds are scaled 2456. That is, the brightness distribution is adjusted according to the scaling profiles (determined in step 2454) so that the resulting visual compilation exhibits the scaling target (established in step 2452).

The present invention is not particularly limited with regard to how the left and right visual feeds are scaled 2456. In certain embodiments, it may be advantageous to scale 2456 the left and right visual feeds as data. For example, considering a simple monochrome brightness value of 0 to 255 for each pixel in a digital image, all brightness values for the digital image might be uniformly reduced by 50% to a 0 to 127 range, so as to produce an arrangement at least somewhat similar to that illustrated in FIG. 9. Other scaling arrangements applied to data for left and right feeds may also be equally suitable.

However, in other embodiments the left and/or right visual feeds may be scaled in other manners, for example through the use of physical filters disposed within optical paths for displays. Filters covering parts of left and right displays so as to linearly darken from 100% brightness transmission to 0% brightness transmission may be disposed between an optical emitter and a viewer, so as to produce an arrangement at least somewhat similar to that illustrated in FIG. 12.

These are examples only, and other arrangements may be equally suitable.

Still with reference to FIG. 24, the left and right scaled visual feeds are outputted 2458 to left and right displays, respectively. Configured as in step 2450 and scaled as in step 2456, the compilation to be presented to a viewer (whether a viewer is present or not) may be anticipated to conform at least substantially with the scaling target. Thus, a uniform, continuous, smooth, etc. brightness distribution (or for other embodiments such as that represented by FIG. 21 a non-uniform, etc. distribution) may be exhibited. In colloquial terms, what is delivered for a viewer to see conforms to the brightness (or other parameter) target set in step 2452.

Although FIG. 24 shows the method therein as being complete following step 2452, it is emphasized that the method in FIG. 24 is an example only and that the present invention is not limited only to steps shown therein. Other steps, other functions, etc. may be incorporated into the method, and/or other methods may be executed in combination with the method according to the present invention. For example, steps associated with measurement, calibration, feedback, adjustment, active correction, etc. of the scaling profile, the scaling itself, etc. may be incorporated, e.g. to facilitate a more accurate and/or dynamically updating 2D/3D/2D arrangement according to the present invention. In addition, for at least certain embodiments at least some portion of the method may repeat, e.g. in an ongoing loop. Other steps, processes, links with other methods, etc. may be equally suitable, and the present invention is not particularly limited with regard thereto.

Figure 25:
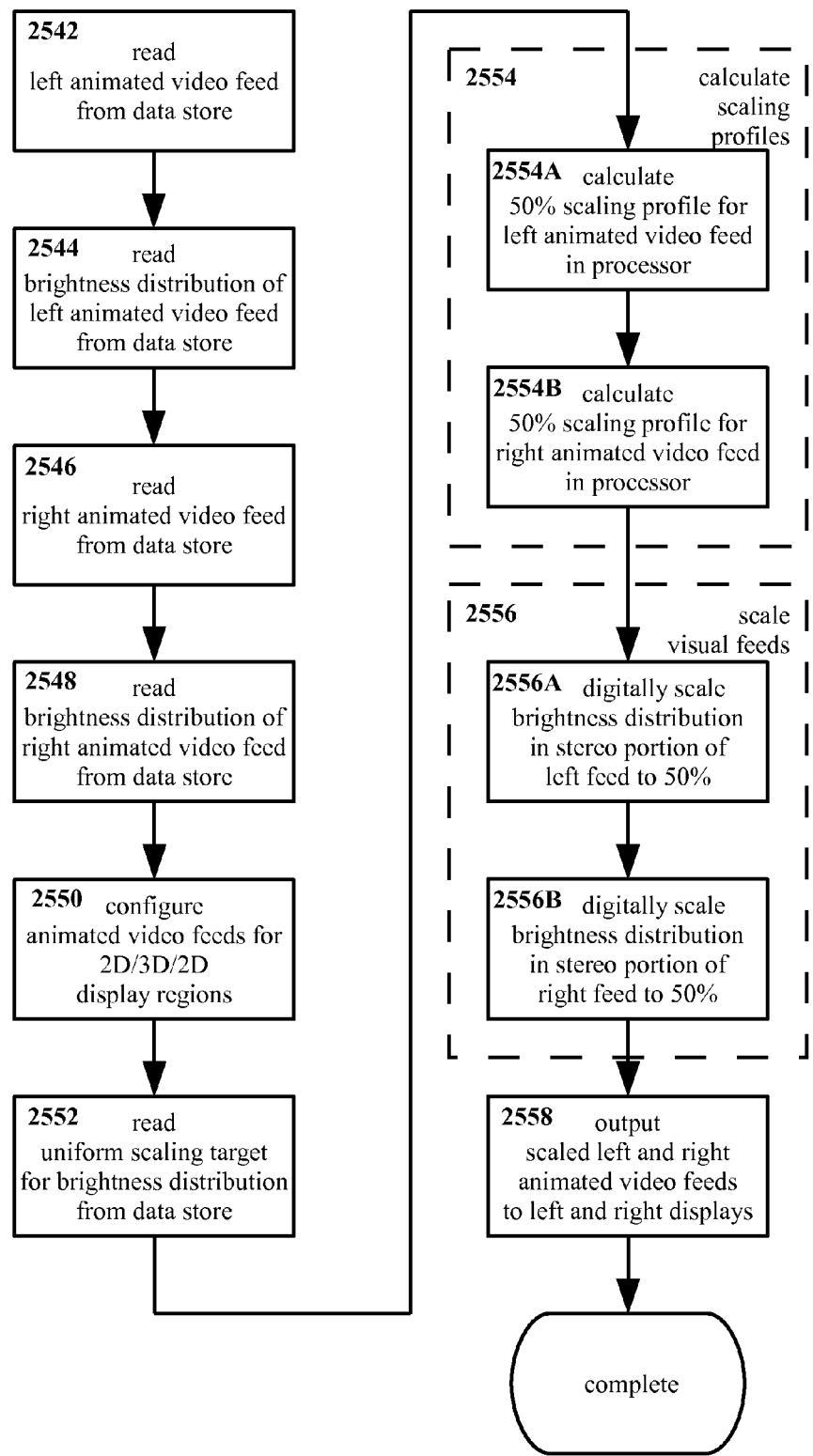
FIG. 25 shows an example method for delivering and controlling multiple feed data according to the present invention, considering and scaling brightness distributions for left and right visual feeds with a stereo/non-stereo/stereo configuration, in flow chart form.

Turning now to FIG. 25, therein is shown another example embodiment of a method for delivering and controlling multiple-feed data according to the present invention, in flow chart form. The arrangement in FIG. 25 is at least somewhat similar to the arrangement previously shown in FIG. 24. However, where FIG. 24 addresses features such as feed parameters, scaling profiles in relatively general terms, FIG. 25 provides a more concrete (but not limiting) example regarding brightness distribution, specific scaling profiles, etc.

In the example method of FIG. 25, a left animated video feed is read 2542 from a data store. The left animated feed is a particular example of a visual or data feed, such as a movie, video game render, etc. Reading 2542 from a data store such as a hard drive, solid state drive, etc. is a particular example of establishing the feed.

The brightness distribution for the left animated video feed is read 2544 from the data store. For example, for a digital video file such as a movie, brightness information for each pixel at each frame may be read and assigned some numerical value, e.g. 0 to 255. However this is an example only, and the present invention is not limited only thereto. Certain file formats may enable brightness distribution to be addressed for a frame of a video feed and/or for a video feed as a whole, without individually addressing each pixel thereof; in such case, identifying brightness distribution as the relevant feed parameter (e.g. by reading data or receiving an instruction indicating that the brightness distribution is the relevant feed parameter, or through some other approach) may be sufficient without further evaluation of the contents of the left animated video feed. Other arrangements also may be equally suitable.

In practice, reading the brightness distribution 2544 for the left animated video feed may be performed together with reading 2542 the left animated video feed, i.e. in reading the video feed, the brightness information for the video feed may inherently also be read. However, the steps may be distinct, either practically or logically, and are identified separately in FIG. 25 for this reason.

Continuing in FIG. 25, a right animated video feed is read 2546 from a data store. The brightness distribution for the right animated video feed also is read 2548 from the data store. The left and right animated video feeds are configured 2550 for 2D/3D/2D (e.g. non-stereo/stereo/non-stereo) display according to the present invention. For the particular example of FIG. 25, this may include determining (e.g. with executable instructions instantiated on a processor) a suitable spatial/geometric alignment of the left and right animated video feeds such that a visual compilation is produced wherein part of the left and right feeds cooperate to produce a central stereo display region, and part of the left and right feeds each form a non-stereo left and right display region respectively.

Still with reference to FIG. 25, a uniform scaling target for brightness distribution is read 2552 from the data store. The uniform scaling target is an example of a scaling target; such a uniform scaling target may correspond for example with the brightness distribution of the compilation 920 in FIG. 9. Such a scaling target may enable compilation of left and right feeds to be outputted a viewer such that content as viewed by the viewer may exhibit an appearance of consistent brightness throughout the area thereof.

Scaling properties are calculated 2554. For purposes of the particular example of FIG. 25, the scaling properties may be calculated separately for each of the left and right animated video feeds. Thus, for the uniform scaling target for brightness distribution (as read in step 2552), a left scaling profile of a consistent 50% reduction for a second portion of the left animated video feed may be calculated 2554A, and a right scaling profile of a consistent 50% reduction for a second portion of the right animated video feed may be calculated 2554B. Such consistent 50% reductions, at least somewhat comparable to the arrangement shown in FIG. 9. However, this is an example only, and other arrangements may be equally suitable.

Moving on in FIG. 25, the visual feeds are scaled 2556. For purposes of the example shown in FIG. 25, scaling may be accomplished digitally, by modifying brightness values for individual pixels, larger areas, etc. of the frames of the left and right feeds. For example, digital "masks" may be generated and applied to second portions of left and right feeds, wherein such masks decreases the brightness of pixels by 50%. However, other arrangements may be equally suitable. Also for purposes of the example in FIG. 25, the left and right animated video feeds may be scaled separately, thus the brightness distribution in the stereo portion of the left animated video feed may be digitally scaled 2556A to 50%, and the brightness distribution in the stereo portion of the right animated video feed may be digitally scaled 2556A to 50%.

The scaled left and right animated video feeds are then outputted 2558 to left and right displays. For the particular example shown in FIG. 25, left and right displays of a near-eye head mounted display may serve, although this is an example only and other arrangements may be equally suitable. (Examples of such an apparatus is shown previously herein in FIG. 3 and FIG. 5, and additional detail is provided subsequently herein with regard to FIG. 28.)

Figure 26:
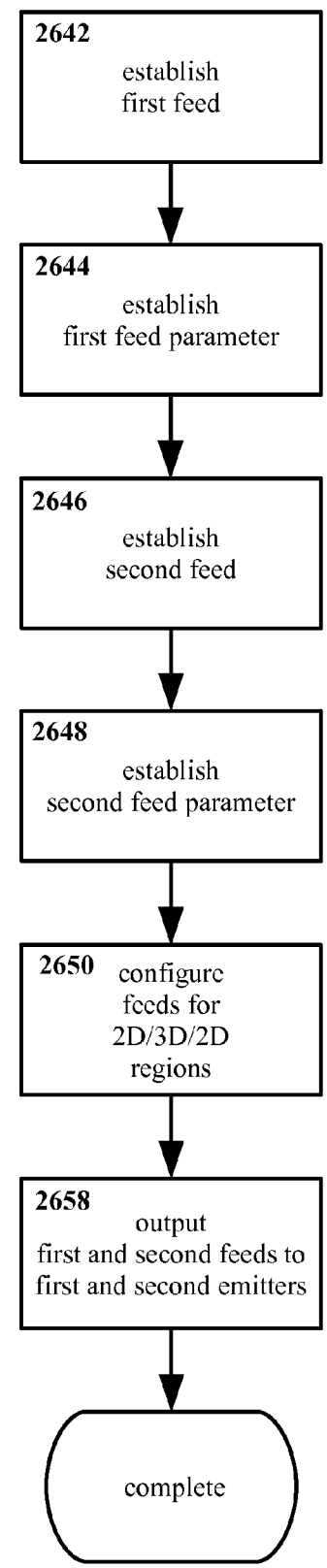
FIG. 26 shows another example method for delivering and controlling multiple feed data according to the present invention, without being specific to feeds, feed parameters, or perceived uniformity, in flow chart form.

Now with reference to FIG. 26, another example embodiment of a method for delivering and controlling multiple-feed data according to the present invention is shown, in flow chart form. The arrangement in FIG. 26 is at least somewhat similar to the arrangements previously shown in FIG. 24 and FIG. 25. However, FIG. 26 addresses an example method that is less particular with regard to types of feed and certain other features. Moreover, the example embodiment of FIG. 26, while configuring feeds for 2D/3D/2D regions according to the present invention, does not include or require the inclusion of scaling of either or both feeds.

In the example embodiment of FIG. 26, a first feed is established 2642. Although feeds are referred to in at least certain instances herein as being visual feeds, animated video feeds, etc. the present invention is not particularly limited with regard to the nature of the feeds. For at least certain embodiments, audio feeds, or even data feeds not associated with particular senses, may be equally suitable.

Likewise, although feeds are referred to in at least certain instances herein as being left and right feeds, the present invention is not limited only to left and right feeds. For at least certain embodiments, upper and lower feeds, or feeds not defined in terms of spatial relationship, may be equally suitable.

Moving on in FIG. 26, a first feed parameter is established 2644. A second feed is established 2646, and a second feed parameter corresponding with the first feed parameter is established 2648. The first and second feeds (which as noted previously, may be visual feeds, and/or may be left and right feeds, though such is not required) are configured so as to cooperate to form a 2D/3D/2D arrangement. That is, a 2D first independent region (corresponding at least conceptually to a left display region as described previously herein) deriving from the first feed, a 3D cooperative region (corresponding at least conceptually to a central display region as described previously herein) deriving from the cooperation of the first and second feeds, and a second independent region (corresponding at least conceptually to a right display region as described previously herein) deriving from the second feed, are made to result from configuring the first and second feeds. Continuing in FIG. 26, the first and second feeds are outputted 2658 to first and second emitters.

It is noted that the example method of FIG. 26 does not include steps of scaling either the first or the second feed, nor steps associated with scaling. Although for at least certain embodiments of the present invention, scaling first and/or second feeds to control some feed parameter may be advantageous (for example to present substantially uniform apparent brightness, as described previously herein), the present invention is not limited only to embodiments wherein feeds are scaled, and/or feed parameters are so controlled. Scaling is not necessarily required when producing a 2D/3D/2D configuration (e.g. a non-stereo/stereo/non-stereo configuration) according to the present invention, and as in the arrangement shown in FIG. 26 scaling may not necessarily be present in all embodiments.

Figure 27:
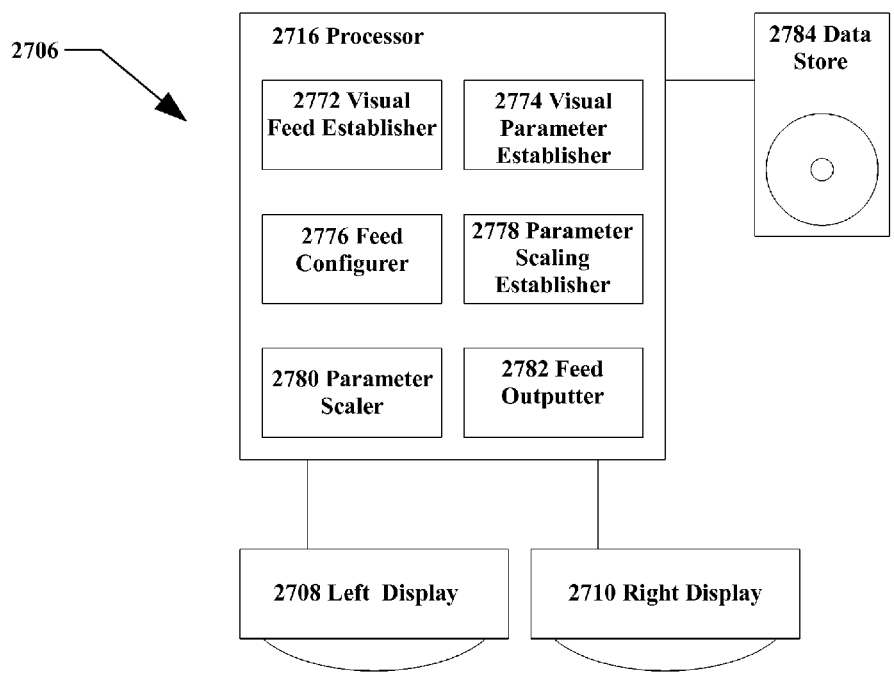
FIG. 27 shows an example embodiment of an apparatus according to the present invention, in schematic view.

Now with reference to FIG. 27, therein is shown an example embodiment of an apparatus 2706 according to the present invention, in schematic form.

In FIG. 27, the apparatus 2706 is shown to include a processor 2716. This is an example only; although for certain embodiments at least certain features of the present invention may be carried out with or in a processor such as a processor with executable instructions instantiated thereon, as noted previously the present invention also may be carried out without necessarily relying upon or utilizing a processor, e.g. as an "all mechanical" hardware implementation utilizing physical filters, optics arranged to configure feeds, etc.

Where a processor 2716 is present, the present invention is not particularly limited with regard to the processor. A range of general-purpose, special-purpose, and embedded systems may be suitable for use as the processor 2716. Moreover, it may be equally suitable for the processor 2716 to consist of two or more physical or logical processor components. Other arrangements also may be equally suitable.

In the example embodiment shown in FIG. 27, several data entities 2772, 2774, 2776, 2778, 2780, and 2782 are shown disposed on the processor 2716. Typically, though not necessarily, the data entities 2772, 2774, 2776, 2778, 2780, and 2782 may include in whole or in part executable instructions and/or data instantiated on the processor 2716.

With regard to the particular data entities 2772, 2774, 2776, 2778, 2780, and 2782 shown in FIG. 27, a visual feed establisher 2772 is disposed on the processor. The visual feed establisher 2772 is adapted to establish left and right visual and/or other data feeds, e.g. still images, animated video, etc. acquired from a hard drive, wifi connection, processor computation, etc. The present invention is not particularly limited with regard to left and right feeds, or the establishment thereof, as previously noted.

A visual parameter establisher 2774 is adapted to establish left and right visual feed parameters, including but not limited to brightness distributions, for the left and right visual feeds, respectively. A feed configurer 2776 is adapted to configure the left and right visual feeds so as to form a left display region, a central display region, and a right display region. The left and right display regions are substantially two-dimensional/non-stereo, and have a visual display parameter at least substantially made up of the left and right visual feed parameters in the first portions of the left and right visual feeds, respectively. The central display region is substantially three-dimensional/stereo, and has a visual display parameter at least substantially made up of the sum of the left and right visual feed parameters in the second portions of the left and right visual feeds, respectively.

A parameter scaling establisher 2778 is adapted to establish a scaling target for the visual display parameter, for example that the visual display parameter be at least substantially uniform across the left, central, and right display regions. The parameter scaling establisher 2778 is also adapted to determine left and right scaling profiles for the left and right visual feed parameters of the left and right visual feeds respectively, such that the left and right scaling profiles at least substantially result in the scaling target being met.

As shown and described with regard to FIG. 27, the parameter scaling establisher 2778 performs two functions, those functions being represented in at least certain other descriptions herein as being (or at least potentially being) distinct, e.g. as at least somewhat corresponding with separate method steps 2052 and 2054 in FIG. 20. However, this is an example only; while the functions are shown as being performed by a single entity in FIG. 27, namely the parameter scaling establisher 2778, other embodiments of the present invention may utilize separate entities, one for establishing the scaling target and one for establishing the scaling profiles. Likewise, other elements shown and described with regard to an apparatus according to the present invention may be combined, subdivided, etc. so long as the functionality described herein for an apparatus according to the present invention is maintained. For example, in certain embodiments of the present invention all of the data entities 2772, 2774, 2776, 2778, 2780, and 2782 may be integrated as a single program, or integrated into a larger program, etc. Other arrangements also may be equally suitable.

Moving on in FIG. 27, a parameter scaler 2780 is adapted to scale left and right visual feed parameters according to left and right scaling profiles, respectively. A feed outputter 2782 is adapted to deliver left and right visual feeds at least substantially as scaled by the parameter scaler 2780 and configured by the feed configure 2776 for output.

The apparatus 2706 in FIG. 27 also includes left and right displays 2708 and 2710 in communication with the processor 2716 (and thus at least potentially in communication with data entities 2772, 2774, 2776, 2778, 2780, and 2782 disposed on the processor 2716). The left and right displays 2708 and 2710 are adapted to display the left and right visual feeds at least substantially as scaled by the parameter scaler 2780 and at least substantially as configured by the feed configure 2776 for output.

The present invention is not particularly limited with regard to the left and right displays 2708 and 2710. A range of devices may be suitable for use as the display 2708 and 2710, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. In addition, while the example apparatus shown in FIG. 27 has left and right displays 2708 and 2710 depicted therein as being physically distinct, in other embodiments it may be equally suitable to use a single physical device adapted to display the left and right visual feeds in a similar manner.

Notably, displays 2708 and 2710 may exhibit varying properties with regard to transmission of visual information therethrough (in addition to or in place of information outputted therefrom). For example, for certain embodiments the displays 2708 and 2710 may be optically see-through (translucent and/or transparent), so as to allow visual imagery to pass therethrough, e.g. to facilitate certain forms of augmented reality. Alternatively, the displays 2708 and 2710 may be virtually see-through, that is, not necessarily transparent but rather adapted to depict the surrounding environment so as to give at least an appearance of being transparent, e.g. to facilitate other forms of augmented reality. As yet another alternative, the displays 2708 and 2710 may be non-see-through (opaque), neither passing light therethrough nor presenting an appearance of passing light therethrough. Other arrangements may be suitable.

Furthermore, as noted at least certain physical elements may be combined, subdivided, etc., and as noted previously with regard to FIG. 27 at least certain data entities may be combined, subdivided, etc. Similarly, physical elements and data entities also may be combined, or otherwise configured in manners varying from what is shown in FIG. 27 but still within the scope of the present invention. For example, the feed outputter 2782 may be integrated with the left and right displays 2708 and 2710, whether as software, firmware, as integral to hardware design, etc. Other arrangements also may be equally suitable.

Still with regard to FIG. 27, therein is shown a data store 2784 such as a hard drive in communication with the processor 2716. Neither a data store 2784 nor the functionality thereof is necessarily required for all embodiments of the present invention, however previous examples and comments with regard to methods and apparatuses according to the present invention include references to data stores and/or other devices/systems, for example as facilitating establishment of visual feeds, visual feed parameters, targets and/or profiles, etc. As a more concrete example, a data store 2784 as shown in FIG. 27 may store information relevant to such establishment, that information being accessed by the processor 2716 and/or instantiated thereupon. The present invention is not particularly limited with regard to the inclusion and/or connection of elements such as a data store 2784, and while not necessarily required, neither are elements such as a data store 2784 (or communicator, sensors, etc.) prohibited.

Also with regard to elements shown in FIG. 27 but not necessarily required in all embodiments, as has been described the present invention may scale brightness distribution and/or other feed parameters, but is not required to do so, and not all embodiments necessarily will do so. For embodiments wherein scaling is not carried out, elements associated with scaling a visual feed parameter, notably the visual parameter establisher 2774, the parameter scaling establisher 2278, and/or the parameter scaler 2280, may be omitted.

Figure 28:
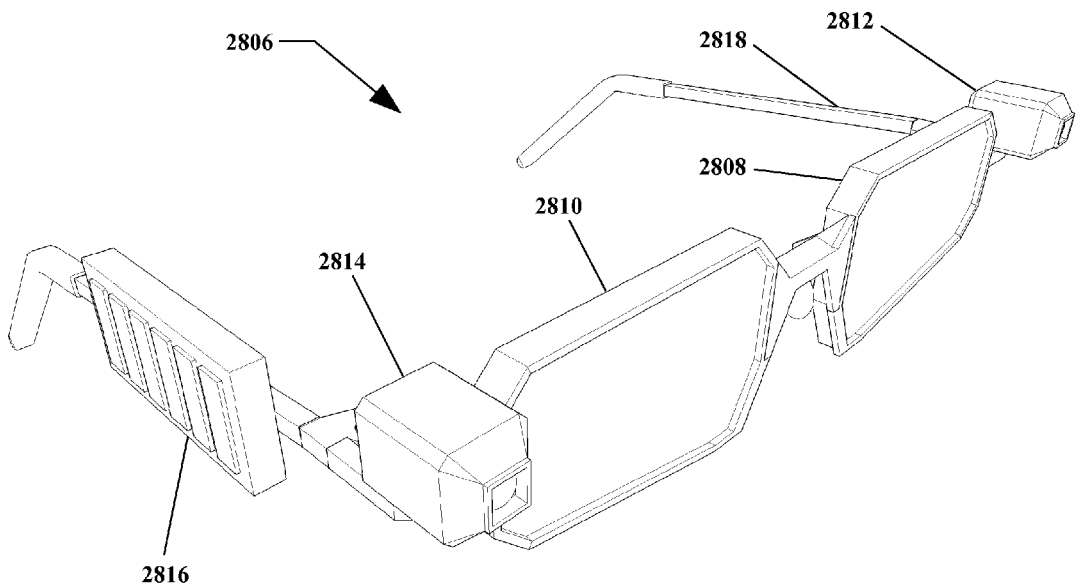
FIG. 28 shows another example embodiment of an apparatus according to the present invention in the form of a head mounted display, in perspective view.

Now with reference to FIG. 28, an apparatus according to the present invention may take many forms, and/or may be combined with and/or incorporated into a variety of devices. FIG. 28 shows one example of an apparatus 2806 according to the present invention configured as a head mounted display, in perspective view.

As shown, the apparatus 2806 includes a processor 2816. Although not visible in perspective view, the processor 2816 may have disposed thereon one or more data entities, such as a visual feed establisher, visual parameter establisher, feed configure, parameter scaling establisher, parameter scaler, feed outputter, etc., for example as comparable to those shown and described previously with regard to FIG. 27. In addition, the example apparatus 2806 includes a body 2818, the body 2818 being in the form of a pair of glasses so as to be wearable e.g. as a head mounted display. The processor 2816 is disposed on the body 2818. Also disposed on the body 2818 are left and right displays 2808 and 2810. In the example as shown, the displays 2808 and 2810 are disposed on the body 2818 such that when the body 2818 is worn the displays 2808 and 2810 would be arranged in front of, facing, and proximate the eyes of a wearer, for example so as to display stereo visual information in a central display region to that wearer, and/or so as to display non-stereo visual information in left and right display regions to the left and right eyes of that viewer respectively.

In addition, the apparatus 2806 shown in FIG. 28 includes left and right sensors 2812 and 2814, shown disposed on the body 2818 such that when the body 2818 is worn the sensors 2812 and 2814 would be arranged in left and right positions proximate and facing substantially outward from the wearer's eyes, for example so as to capture visual information as may be utilized for combination with visual information outputted by displays 2808 and 2810 for purposes of augmented reality, etc. However, this is an example only, and neither sensors nor the functionality thereof are necessarily required for the present invention.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A machine implemented method, comprising in a processor:
    establishing a left visual feed;
    establishing a non-directional left visual feed spatial parameter for said left visual feed;
    establishing a right visual feed;
    establishing a non-directional right visual feed spatial parameter for said right visual feed, said right feed visual parameter at least substantially corresponding with said left visual feed parameter;
    configuring said left visual feed in cooperation with said right visual field so as to define:

a left display region comprising a first portion of said left visual feed and at least substantially excluding said right visual feed, wherein a visual display parameter in said left display region comprises said left visual feed parameter in said first portion of said left visual feed;

a right display region comprising a first portion of said right visual feed and at least substantially excluding said left visual feed, wherein said visual display parameter in said right display region comprises said right visual feed parameter in said first portion of said right visual feed;

a central display region comprising a second portion of said left visual feed in stereo cooperation with a second portion of said right visual feed, wherein said visual display parameter in said right display region comprises a sum of said left feed visual parameter in said second portion of said left visual feed and said right feed visual parameter in said second portion of said right feed;

establishing a scaling target for said visual display parameter in at least one of said left display region, said central display region, and said right display region;

establishing a left scaling profile for said left visual feed parameter in said left visual feed and a right scaling profile for said right visual feed parameter in said right visual feed, such that a scaled left visual feed parameter of said left visual feed and a scaled right visual feed parameter of said right visual feed cooperate to at least substantially achieve said scaling target for said visual display parameter;

scaling said left visual feed parameter in said left visual feed according to said left scaling profile;

scaling said right visual feed parameter in said right visual feed according to said right scaling profile; and outputting said left and right visual feeds so scaled.

2. The method of claim 1, wherein:
said left and right visual feed parameters comprise left and right spatial brightness distributions.

3. The method of claim 1, wherein:
said left feed visual feed parameter comprises a left color channel spatial brightness distribution; and
said right feed visual feed parameter comprises a corresponding right color channel spatial brightness distribution.

4. The method of claim 1, wherein:
said left and right visual feed parameters comprise left and right spatial contrast distributions.

5. The method of claim 1, wherein:
said left and right visual feed parameters comprise left and right spatial dynamic range distributions.

6. The method of claim 1, wherein:
said scaling target comprises said visual display parameter being at least substantially uniform in at least one of said left, central, and right display regions.

7. The method of claim 1, wherein:
said scaling target comprises said visual display parameter being at least substantially uniform in said left, central, and right display regions.

8. The method of claim 1, wherein:
said scaling target comprises said visual display parameter being at least substantially uniform proximate a left transition between said left and central display regions and proximate a right transition between said central and right display regions.

9. The method of claim 1, wherein:
said scaling target comprises said visual display parameter being at least substantially smooth in at least one of said left, central, and right display regions.

10. The method of claim 1, wherein:
said scaling target comprises said visual display parameter being at least substantially smooth in said left, central, and right display regions.

11. The method of claim 1, wherein:
said scaling target comprises said visual display parameter being at least substantially smooth proximate a left transition between said left and central display regions and proximate a right transition between said central and right display regions.

12. The method of claim 1, wherein:
said scaling target comprises said visual display parameter being at least substantially continuous in at least one of said left, central, and right display regions.

13. The method of claim 1, wherein:
said scaling target comprises said visual display parameter being at least substantially continuous in said left, central, and right display regions.

14. The method of claim 1, wherein:
said scaling target comprises said visual display parameter being at least substantially continuous proximate a left transition between said left and central display regions and proximate a right transition between said central and right display regions.

15. The method of claim 1, wherein:
said scaling target comprises said visual display parameter being greater in magnitude in said central display region than said left and right display regions.

16. The method of claim 1, wherein:
said left visual feed parameter is at least substantially different in magnitude from said right visual parameter; and
said scaling target comprises said visual display parameter in said central display region proximate said left display region at least substantially matching in magnitude said visual display region in said left display region, and said visual display parameter in said central display region proximate said right display region at least substantially matching in magnitude said visual display region in said right display region.

17. The method of claim 1, wherein:
said left scaling profile comprises a substantially instantaneous decrease in said left visual feed parameter at least substantially aligned with a left boundary between said first and second portions of said left visual feed; and
said right scaling profile comprises a substantially instantaneous decrease in said right visual feed parameter at least substantially aligned with a right boundary between said first and second portions of said right visual feed.

18. The method of claim 1, wherein:
said left scaling profile comprises a substantially instantaneous decrease in said left visual feed parameter of at least approximately 50% at least substantially aligned with a left boundary between said first and second portions of said left visual feed; and
said right scaling profile comprises a substantially instantaneous decrease in said right visual feed parameter of at least approximately 50% at least substantially aligned with a right boundary between said first and second portions of said right visual feed.

19. The method of claim 1, wherein:
said left scaling profile comprises a substantially linear decrease in said left visual feed parameter initiating at least substantially in alignment with a left boundary between said first and second portions of said left visual feed; and
said right scaling profile comprises a substantially linear decrease in said right visual feed parameter initiating at least substantially in alignment with a right boundary between said first and second portions of said right visual feed.

20. The method of claim 1, wherein:
said left scaling profile comprises:
   between a left boundary between said first and second portions of said left visual feed and a first distance from said left boundary, said left visual feed parameter decreases at least substantially increasingly;
   between said first distance from said left boundary and an edge of said second portion of said left feed distal from said left boundary, said left visual feed parameter decreases at least substantially decreasingly;
said right scaling profile comprises:
   between a right boundary between said first and second portions of said right visual feed and a first distance from said right boundary, said right visual feed parameter decreases at least substantially increasingly; and
   between said first distance from said right boundary and an edge of said second portion of said right feed distal from said right boundary, said right visual feed parameter decreases at least substantially decreasingly.

21. The method of claim 1, wherein:
said left scaling profile comprises:
   between a left boundary between said first and second portions of said left visual feed and a first distance from said left boundary, said left visual feed parameter decreases at least substantially increasingly;
   between said first distance from said left boundary and a second distance from said left boundary, said left visual feed parameter decreases at least substantially linearly;
   between said second distance from said left boundary and an edge of said second portion of said left feed distal from said left boundary, said left visual feed parameter decreases at least substantially decreasingly;
said right scaling profile comprises:
   between a right boundary between said first and second portions of said right visual feed and a first distance from said right boundary, said right visual feed parameter decreases at least substantially increasingly;
   between said first distance from said right boundary and a second distance from said right boundary, said right visual feed parameter decreases at least substantially linearly; and
   between said second distance from said right boundary and an edge of said second portion of said right feed distal from said right boundary, said right visual feed parameter decreases at least substantially decreasingly.

22. The method of claim 1, wherein:
said left scaling profile comprises:
   between a first distance from a left boundary between said first and second portions of said left visual feed and a second distance from said left boundary, said left visual feed parameter decreases at least substantially increasingly;
   between a third distance from said left boundary and a fourth distance from said left boundary, said left visual feed parameter decreases at least substantially linearly;
   between a fifth distance from said left boundary and a sixth distance from said left boundary, said left visual feed parameter decreases at least substantially decreasingly;
said right scaling profile comprises:
   between a first distance from a right boundary between said first and second portions of said right visual feed and a second distance from said right boundary, said right visual feed parameter decreases at least substantially increasingly;
   between a third distance from said right boundary and a fourth distance from said right boundary, said right visual feed parameter decreases at least substantially linearly; and
   between a fifth distance from said right boundary and a sixth distance from said right boundary, said right visual feed parameter decreases at least substantially decreasingly.

23. The method of claim 1, wherein:
said left scaling profile comprises:
   between a left boundary between said first and second portions of said left visual feed and a first distance from said left boundary, said left visual feed parameter decreases at least substantially increasingly;
   between said first distance from said left boundary and a second distance from said left boundary, said left visual feed parameter decreases at least substantially decreasingly;
   between said second distance from said left boundary and a third distance from said left boundary, said left visual feed parameter decreases at least substantially increasingly;
   between said third distance from said left boundary and an edge of said second portion of said left feed distal from said left boundary, said left visual feed parameter decreases at least substantially decreasingly;
said right scaling profile comprises:
   between a right boundary between said first and second portions of said right visual feed and a first distance from said right boundary, said right visual feed parameter decreases at least substantially increasingly;
   between said first distance from said right boundary and a second distance from said right boundary, said right visual feed parameter decreases at least substantially decreasingly;
   between said second distance from said right boundary and a third distance from said right boundary, said right visual feed parameter decreases at least substantially increasingly; and
   between said third distance from said right boundary and an edge of said second portion of said right feed distal from said right boundary, said right visual feed parameter decreases at least substantially decreasingly.

24. The method of claim 1, wherein:
said left scaling profile comprises:
   between a first distance from a left boundary between said first and second portions of said left visual feed and a second distance from said left boundary, said left visual feed parameter decreases at least substantially increasingly;

between said second distance from said left boundary and a third distance from said left boundary, said left visual feed parameter decreases at least substantially decreasingly;

between said third distance from said left boundary and a fourth distance from said left boundary, said left visual feed parameter is at least substantially uniform;

between said fourth distance from said left boundary and a fifth distance from said left boundary, said left visual feed parameter decreases at least substantially increasingly;

between said fifth distance from said left boundary and a sixth distance from said left boundary, said left visual feed parameter decreases at least substantially decreasingly;

said right scaling profile comprises:

between a first distance from a right boundary between said first and second portions of said right visual feed and a second distance from said right boundary, said right visual feed parameter decreases at least substantially increasingly;

between said second distance from said right boundary and a third distance from said right boundary, said right visual feed parameter decreases at least substantially decreasingly;

between said third distance from said right boundary and a fourth distance from said right boundary, said right visual feed parameter is at least substantially uniform;

between said fourth distance from said right boundary and a fifth distance from said right boundary, said right visual feed parameter decreases at least substantially increasingly; and between said fifth distance from said right boundary and a sixth distance from said right boundary, said right visual feed parameter decreases at least substantially decreasingly.

25. The method of claim 1, wherein:

said left scaling profile comprises:

between a first distance from a left boundary between said first and second portions of said left visual feed and a second distance from said left boundary, said left visual feed parameter decreases at least substantially increasingly;

between said second distance from said left boundary and a third distance from said left boundary, said left visual feed parameter decreases at least substantially linearly;

between said third distance from said left boundary and a fourth distance from said left boundary, said left visual feed parameter decreases at least substantially decreasingly;

between said fourth distance from said left boundary and a fifth distance from said left boundary, said left visual feed parameter is at least substantially uniform;

between said fifth distance from said left boundary and a sixth distance from said left boundary, said left visual feed parameter decreases at least substantially increasingly;

between said sixth distance from said left boundary and a seventh distance from said left boundary, said left visual feed parameter decreases at least substantially linearly;

between said seventh distance from said left boundary and an eighth distance from said left boundary, said left visual feed parameter decreases at least substantially decreasingly;

said right scaling profile comprises:

between a first distance from a right boundary between said first and second portions of said right visual feed and a second distance from said right boundary, said right visual feed parameter decreases at least substantially increasingly;

between said second distance from said right boundary and a third distance from said right boundary, said right visual feed parameter decreases at least substantially linearly;

between said third distance from said right boundary and a fourth distance from said right boundary, said right visual feed parameter decreases at least substantially decreasingly;

between said fourth distance from said right boundary and a fifth distance from said right boundary, said right visual feed parameter is at least substantially uniform;

between said fifth distance from said right boundary and a sixth distance from said right boundary, said right visual feed parameter decreases at least substantially increasingly;

between said sixth distance from said right boundary and a seventh distance from said right boundary, said right visual feed parameter decreases at least substantially linearly; and between said seventh distance from said right boundary and an eighth distance from said right boundary, said right visual feed parameter decreases at least substantially decreasingly.

26. The method of claim 1, wherein:

said left scaling profile comprises:

between a left boundary between said first and second portions of said left visual feed and a first distance from said left boundary, said left visual feed parameter decreases at least substantially quadratically increasingly;

between said first distance from said left boundary and an edge of said second portion of said left feed distal from said left boundary, said left visual feed parameter decreases at least substantially quadratically decreasingly;

said right scaling profile comprises:

between a right boundary between said first and second portions of said right visual feed and a first distance from said right boundary, said right visual feed parameter decreases at least substantially quadratically increasingly; and between said first distance from said right boundary and an edge of said second portion of said right feed distal from said right boundary, said right visual feed parameter decreases at least substantially quadratically decreasingly.

27. The method of claim 1, wherein:

said left scaling profile comprises:

between a left boundary between said first and second portions of said left visual feed and a first distance from said left boundary, said left visual feed parameter decreases at least substantially quadratically increasingly;

between said first distance from said left boundary and a second distance from said left boundary, said left visual feed parameter decreases at least substantially linearly;

between said second distance from said left boundary and an edge of said second portion of said left feed distal from said left boundary, said left visual feed parameter decreases at least substantially quadratically decreasingly;

said right scaling profile comprises:

between a right boundary between said first and second portions of said right visual feed and a first distance from said right boundary, said right visual feed parameter decreases at least substantially quadratically increasingly;

between said first distance from said right boundary and a second distance from said right boundary, said right visual feed parameter decreases at least substantially linearly; and between said second distance from said right boundary and an edge of said second portion of said right feed distal from said right boundary, said right visual feed parameter decreases at least substantially quadratically decreasingly.

28. The method of claim 1, wherein:

said left scaling profile comprises:

between a first distance from a left boundary between said first and second portions of said left visual feed and a second distance from said left boundary, said left visual feed parameter decreases at least substantially quadratically increasingly;

between a third distance from said left boundary and a fourth distance from said left boundary, said left visual feed parameter decreases at least substantially linearly;

between a fifth distance from said left boundary and a sixth distance from said left boundary, said left visual feed parameter decreases at least substantially quadratically decreasingly;

said right scaling profile comprises:

between a first distance from a right boundary between said first and second portions of said right visual feed and a second distance from said right boundary, said right visual feed parameter decreases at least substantially quadratically increasingly;

between a third distance from said right boundary and a fourth distance from said right boundary, said right visual feed parameter decreases at least substantially linearly; and between a fifth distance from said right boundary and a sixth distance from said right boundary, said right visual feed parameter decreases at least substantially quadratically decreasingly.

29. The method of claim 1, wherein:

said left scaling profile comprises:

between a left boundary between said first and second portions of said left visual feed and a first distance from said left boundary, said left visual feed parameter decreases at least substantially quadratically increasingly;

between said first distance from said left boundary and a second distance from said left boundary, said left visual feed parameter decreases at least substantially quadratically decreasingly;

between said second distance from said left boundary and a third distance from said left boundary, said left visual feed parameter decreases at least substantially quadratically increasingly;

between said third distance from said left boundary and an edge of said second portion of said left feed distal from said left boundary, said left visual feed parameter decreases at least substantially quadratically decreasingly;

said right scaling profile comprises:

between a right boundary between said first and second portions of said right visual feed and a first distance from said right boundary, said right visual feed parameter decreases at least substantially quadratically increasingly;

between said first distance from said right boundary and a second distance from said right boundary, said right visual feed parameter decreases at least substantially quadratically decreasingly;

between said second distance from said right boundary and a third distance from said right boundary, said right visual feed parameter decreases at least substantially quadratically increasingly; and between said third distance from said right boundary and an edge of said second portion of said right feed distal from said right boundary, said right visual feed parameter decreases at least substantially quadratically decreasingly.

30. The method of claim 1, wherein:

said left scaling profile comprises:

between a first distance from a left boundary between said first and second portions of said left visual feed and a second distance from said left boundary, said left visual feed parameter decreases at least substantially quadratically increasingly;

between said second distance from said left boundary and a third distance from said left boundary, said left visual feed parameter decreases at least substantially quadratically decreasingly;

between said third distance from said left boundary and a fourth distance from said left boundary, said left visual feed parameter is at least substantially uniform;

between said fourth distance from said left boundary and a fifth distance from said left boundary, said left visual feed parameter decreases at least substantially quadratically increasingly;

between said fifth distance from said left boundary and a sixth distance from said left boundary, said left visual feed parameter decreases at least substantially quadratically decreasingly;

said right scaling profile comprises:

between a first distance from a right boundary between said first and second portions of said right visual feed and a second distance from said right boundary, said right visual feed parameter decreases at least substantially quadratically increasingly;

between said second distance from said right boundary and a third distance from said right boundary, said right visual feed parameter decreases at least substantially quadratically decreasingly;

between said third distance from said right boundary and a fourth distance from said right boundary, said right visual feed parameter is at least substantially uniform;

between said fourth distance from said right boundary and a fifth distance from said right boundary, said right visual feed parameter decreases at least substantially quadratically increasingly; and between said fifth distance from said right boundary and a sixth distance from said right boundary, said right visual feed parameter decreases at least substantially quadratically decreasingly.

31. The method of claim 1, wherein:

said left scaling profile comprises:

between a first distance from a left boundary between said first and second portions of said left visual feed and a second distance from said left boundary, said left visual feed parameter decreases at least substantially quadratically increasingly;

between said second distance from said left boundary and a third distance from said left boundary, said left visual feed parameter decreases at least substantially linearly;

between said third distance from said left boundary and a fourth distance from said left boundary, said left visual feed parameter decreases at least substantially quadratically decreasingly;

between said fourth distance from said left boundary and a fifth distance from said left boundary, said left visual feed parameter is at least substantially uniform;

between said fifth distance from said left boundary and a sixth distance from said left boundary, said left visual feed parameter decreases at least substantially quadratically increasingly;

between said sixth distance from said left boundary and a seventh distance from said left boundary, said left visual feed parameter decreases at least substantially linearly;

between said seventh distance from said left boundary and an eighth distance from said left boundary, said left visual feed parameter decreases at least substantially quadratically decreasingly;

said right scaling profile comprises:

between a first distance from a right boundary between said first and second portions of said right visual feed and a second distance from said right boundary, said right visual feed parameter decreases at least substantially quadratically increasingly;

between said second distance from said right boundary and a third distance from said right boundary, said right visual feed parameter decreases at least substantially linearly;

between said third distance from said right boundary and a fourth distance from said right boundary, said right visual feed parameter decreases at least substantially quadratically decreasingly;

between said fourth distance from said right boundary and a fifth distance from said right boundary, said right visual feed parameter is at least substantially uniform;

between said fifth distance from said right boundary and a sixth distance from said right boundary, said right visual feed parameter decreases at least substantially quadratically increasingly;

between said sixth distance from said right boundary and a seventh distance from said right boundary, said right visual feed parameter decreases at least substantially linearly; and between said seventh distance from said right boundary and an eighth distance from said right boundary, said right visual feed parameter decreases at least substantially quadratically decreasingly.

32. The method of claim 1, comprising:

scaling said left visual feed parameter of said left visual feed and said right visual feed parameter of said right visual feed at least substantially mutually mirrored.

33. The method of claim 1, wherein:

said left scaling profile averages approximately 50% of said left visual feed parameter; and said right scaling profile averages approximately 50% of said right visual feed parameter.

34. The method of claim 1, comprising:

scaling said left visual feed parameter in said second portion of said left visual feed by applying a left filter thereto; and scaling said right visual feed parameter in said second portion of said right visual feed by applying a right filter thereto.

35. The method of claim 34, wherein:

said left filter is a virtual filter; and said right filter is a virtual filter.

36. The method of claim 34, wherein:

said left filter is a physical filter; and said right filter is a physical filter.

37. The method of claim 34, wherein:

said left filter is adjustable in a degree of scaling; and said right filter is adjustable in a degree of scaling.

38. The method of claim 34, wherein:

said left filter is adjustable in position relative to said left visual feed; and said right filter is adjustable in position relative to said right visual feed.

39. The method of claim 34, wherein:

said left filter is spatially non-uniform in a degree of scaling; and said right filter is spatially non-uniform in a degree of scaling.

40. An apparatus, comprising:

a processor;

a visual feed establisher comprising executable instructions instantiated on said processor;

a visual feed parameter establisher comprising executable instructions instantiated on said processor a visual feed configurer comprising executable instructions instantiated on said processor;

a visual feed parameter scaling establisher comprising executable instructions instantiated on said processor;

a visual feed parameter scaler comprising executable instructions instantiated on said processor;

a visual feed outputter comprising executable instructions instantiated on said processor;

a left visual display in communication with said processor; and a right visual display in communication with said processor;

wherein:

said visual feed establisher is adapted to establish left and right visual feeds;

said visual feed parameter establisher is adapted to establish non-directional left and right spatial visual feed parameters of said left and right visual feeds respectively;

said visual feed configurer is adapted to configure said left and right visual feeds as a left display region, a central display region, and a right display region:

said left display region being at least substantially non-stereo, comprising a first portion of said left visual feed, and at least substantially excluding said right visual feed, wherein a visual display parameter in said left display region comprises said left visual feed parameter in said first portion of said left visual feed;

said right display region being at least substantially non-stereo, comprising a first portion of said right visual feed, and at least substantially excluding said left visual feed, wherein said visual display parameter in said right display region comprises said right visual feed parameter in said first portion of said right visual feed;

said central display region being at least substantially stereo and comprising a second portion of said left visual feed in stereo cooperation with a second portion of said right visual feed, wherein said visual display parameter in said right display region comprises a sum of said left feed visual parameter in said second portion of said left visual feed and said right feed visual parameter in said second portion of said right feed;

said visual feed parameter scaling establisher is adapted to establish a scaling target for said visual display parameter in at least one of said left, central, and right display regions, and to establish a left scaling profile for said left visual feed parameter in said left visual feed and a right scaling profile for said right visual feed parameter in said right visual feed so as to at least substantially achieve said scaling target;

said visual feed parameter scaler is adapted to scale said left visual feed parameter in said left visual feed and said right visual feed parameter in said right visual feed at least substantially according to said left and right scaling profiles respectively;

said visual feed outputter is adapted to deliver left and right scaled visual feeds to left and right visual displays respectively at least substantially as configured by said visual feed configurer; and said left and right visual displays are adapted to display said left and right scaled visual feeds respectively, at least substantially as configured by said visual feed configurer.

41. The apparatus of claim 40, wherein:
said left and right visual feed parameters comprise left and right spatial brightness distributions.

42. The apparatus of claim 40, wherein:
said visual feed parameter scaler comprises left and right virtual filters, said left filter being adapted to scale said left visual feed parameter of said left visual feed at least substantially as data, and said right filter being adapted to scale said right visual feed parameter of said right visual feed at least substantially as data.

43. The apparatus of claim 40, wherein:
said visual feed parameter scaler comprises left and right physical filters, said left filter being adapted to scale said left visual feed parameter of said left visual feed at least substantially optically, and said right filter being adapted to scale said right visual feed parameter of said right visual feed at least substantially optically.

44. The apparatus of claim 40, wherein:
said left and right visual displays comprise virtual see-through displays.

45. The apparatus of claim 40, wherein:
said left and right visual displays comprise optical see-through displays.

46. The apparatus of claim 40, wherein:
said left and right visual displays comprise opaque displays.

47. The apparatus of claim 40, comprising:
a body adapted to be worn on a head;
said left and right visual displays being engaged with said body such that when said body is worn on said head:
said left visual display is disposed proximate, at least substantially facing, and at least substantially in front of a left eye of said head;
said right visual display is disposed proximate, at least substantially facing, and at least substantially in front of a right eye of said head.

48. A machine implemented method, comprising in a processor:
establishing a left visual feed;
establishing a non-directional left brightness spatial distribution for said left visual feed;
establishing a right visual feed;
establishing a non-directional right brightness spatial distribution for said right visual feed;
configuring said left visual feed in cooperation with said right visual field so as to define:
a left display region comprising a first portion of said left visual feed and at least substantially excluding said right visual feed, wherein a display brightness distribution in said left display region comprises said left brightness distribution in said first portion of said left visual feed;
a right display region comprising a first portion of said right visual feed and at least substantially excluding said left visual feed, wherein said display brightness distribution in said right display region comprises said right brightness distribution in said first portion of said right visual feed;
a central display region comprising a second portion of said left visual feed in stereo cooperation with a second portion of said right visual feed, wherein said display brightness distribution in said right display region comprises a sum of said left brightness distribution in said second portion of said left visual feed and said right brightness distribution in said second portion of said right feed;
establishing a scaling target for said display brightness distribution in said left display region, said central display region, and said right display region, said scaling target comprising said display brightness distribution being at least substantially uniform in said left, central, and right display regions;
establishing a left scaling profile for said left brightness distribution and a right scaling profile for said right brightness distribution, such that a scaled left brightness distribution and a scaled right brightness distribution cooperate to at least substantially achieve said scaling target for said display brightness distribution, wherein:
said left scaling profile comprises:
between a left boundary between said first and second portions of said left visual feed and a first distance from said left boundary, said left brightness distribution decreases at least substantially quadratically increasingly;
between said first distance from said left boundary and a second distance from said left boundary, said left brightness distribution decreases at least substantially quadratically decreasingly;
between said second distance from said left boundary and a third distance from said left boundary, said left brightness distribution is at least substantially uniform;

between said third distance from said left boundary and a fourth distance from said left boundary, said left brightness distribution decreases at least substantially quadratically increasingly;

between said fourth distance from said left boundary and an edge of said second portion of said left feed distal from said left boundary, said left brightness distribution decreases at least substantially quadratically decreasingly;

said right scaling profile comprises:
between a right boundary between said first and second portions of said right visual feed and a first distance from said right boundary, said right brightness distribution decreases at least substantially quadratically increasingly;

between said first distance from said right boundary and a second distance from said right boundary, said right brightness distribution decreases at least substantially quadratically decreasingly;

between said second distance from said right boundary and a third distance from said right boundary, said right brightness distribution is at least substantially uniform;

between said third distance from said right boundary and a fourth distance from said right boundary, said right brightness distribution decreases at least substantially quadratically increasingly;

between said fourth distance from said right boundary and an edge of said second portion of said right feed distal from said right boundary, said right brightness distribution decreases at least substantially quadratically decreasingly;

scaling said left brightness distribution according to said left scaling profile;

scaling said right brightness distribution according to said right scaling profile; and outputting said left and right visual feeds so scaled.

49. An apparatus, comprising:
a body adapted to be worn on a head;
a processor disposed on said body;
a visual feed establisher comprising executable instructions instantiated on said processor;
a brightness distribution establisher comprising executable instructions instantiated on said processor
a visual feed configurer comprising executable instructions instantiated on said processor;
a brightness distribution scaling establisher comprising executable instructions instantiated on said processor;
a brightness distribution scaler comprising executable instructions instantiated on said processor;
a visual feed outputter comprising executable instructions instantiated on said processor; and
an optically see-through left visual display disposed on said body and in communication with said processor, and an optically see-through right visual display disposed on said body and in communication with said processor, said left and right visual displays being engaged with said body such that when said body is worn on said head said left visual display is disposed proximate, at least substantially facing, and at least substantially in front of a left eye of said head, and said right visual display is disposed proximate, at least substantially facing, and at least substantially in front of a right eye of said head;

wherein:
said visual feed establisher is adapted to establish left and right visual feeds;

said visual feed parameter establisher is adapted to establish non-directional left and right spatial brightness distributions of said left and right visual feeds respectively;

said visual feed configurer is adapted to configure said left and right visual feeds as a left display region, a central display region, and a right display region:
said left display region being at least substantially non-stereo, comprising a first portion of said left visual feed, and at least substantially excluding said right visual feed, wherein a display brightness distributions in said left display region comprises said left brightness distribution in said first portion of said left visual feed;

said right display region being at least substantially non-stereo, comprising a first portion of said right visual feed, and at least substantially excluding said left visual feed, wherein said visual display parameter in said right display region comprises said right brightness distribution in said first portion of said right visual feed;

said central display region being at least substantially stereo and comprising a second portion of said left visual feed in stereo cooperation with a second portion of said right visual feed, wherein said visual display parameter in said right display region comprises a sum of said left brightness distribution in said second portion of said left visual feed and said right brightness distribution in said second portion of said right feed;

said brightness distribution scaling establisher is adapted to establish a scaling target for said display brightness distribution in said left, central, and right display regions, said scaling target comprising said display brightness distribution being at least substantially uniform in said left, central, and right display regions;

said brightness distribution scaling establisher is further adapted to establish a left scaling profile for said left brightness distribution in said left visual feed and a right scaling profile for said right brightness distribution in said right visual feed so as to at least substantially achieve said scaling target, wherein:
said left scaling profile comprises:
between a left boundary between said first and second portions of said left visual feed and a first distance from said left boundary, said left brightness distribution decreases at least substantially quadratically increasingly;

between said first distance from said left boundary and a second distance from said left boundary, said left brightness distribution decreases at least substantially quadratically decreasingly;

between said second distance from said left boundary and a third distance from said left boundary, said left brightness distribution is at least substantially uniform;

between said third distance from said left boundary and a fourth distance from said left boundary, said left brightness distribution decreases at least substantially quadratically increasingly;

between said fourth distance from said left boundary and an edge of said second portion of said left feed distal from said left boundary, said left brightness distribution decreases at least substantially quadratically decreasingly;

said right scaling profile comprises:
- between a right boundary between said first and second portions of said right visual feed and a first distance from said right boundary, said right brightness distribution decreases at least substantially quadratically increasingly;
- between said first distance from said right boundary and a second distance from said right boundary, said right brightness distribution decreases at least substantially quadratically decreasingly;
- between said second distance from said right boundary and a third distance from said right boundary, said right brightness distribution is at least substantially uniform;
- between said third distance from said right boundary and a fourth distance from said right boundary, said right brightness distribution decreases at least substantially quadratically increasingly;
- between said fourth distance from said right boundary and an edge of said second portion of said right feed distal from said right boundary, said right brightness distribution decreases at least substantially quadratically decreasingly;

said brightness distribution scaler is adapted to scale said left brightness distribution in said left visual feed and said right brightness distribution in said right visual feed at least substantially according to said left and right scaling profiles respectively;

said visual feed outputter is adapted to deliver left and right scaled visual feeds to left and right visual displays respectively at least substantially as configured by said visual feed configurer; and said left and right visual displays are adapted to display said left and right scaled visual feeds respectively, at least substantially as configured by said visual feed configurer.

50. An apparatus, comprising:

means for establishing left and right visual feeds;

means for establishing non-directional left and right visual feed spatial parameters of said left and right visual feeds respectively;

means for configuring said left and right visual feeds as a left display region, a central display region, and a right display region:
- said left display region being at least substantially non-stereo, comprising a first portion of said left visual feed, and at least substantially excluding said right visual feed, wherein a visual display parameter in said left display region comprises said left visual feed parameter in said first portion of said left visual feed;
- said right display region being at least substantially non-stereo, comprising a first portion of said right visual feed, and at least substantially excluding said left visual feed, wherein said visual display parameter in said right display region comprises said right visual feed parameter in said first portion of said right visual feed;
- said central display region being at least substantially stereo and comprising a second portion of said left visual feed in stereo cooperation with a second portion of said right visual feed, wherein said visual display parameter in said right display region comprises a sum of said left feed visual parameter in said second portion of said left visual feed and said right feed visual parameter in said second portion of said right feed;

means for establishing a scaling target for said visual display parameter in at least one of said left, central, and right display regions;

means for establishing a left scaling profile for said left visual feed parameter in said left visual feed and a right scaling profile for said right visual feed parameter in said right visual feed so as to at least substantially achieve said scaling target;

means for scaling said left visual feed parameter in said left visual feed and said right visual feed parameter in said right visual feed at least substantially according to said left and right scaling profiles respectively; and means for outputting said left and right scaled visual feeds at least substantially as configured by said visual feed configurer.

* * * * *